United States Patent
Asai

(10) Patent No.: US 8,169,666 B2
(45) Date of Patent: May 1, 2012

(54) THRESHOLD MATRIX GENERATION METHOD, HALFTONE IMAGE GENERATION METHOD, AND HALFTONE IMAGE GENERATING APPARATUS

(75) Inventor: Hiroshi Asai, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 495 days.

(21) Appl. No.: 12/372,913

(22) Filed: Feb. 18, 2009

(65) Prior Publication Data

US 2009/0231629 A1      Sep. 17, 2009

(30) Foreign Application Priority Data

Mar. 12, 2008  (JP) ................................ P2008-062837

(51) Int. Cl.
*G06K 15/00*    (2006.01)

(52) U.S. Cl. ........ 358/3.06; 358/1.9; 358/3.09; 358/3.1; 358/3.3; 358/534

(58) Field of Classification Search ........................ None
See application file for complete search history.

(56) References Cited

U.S. PATENT DOCUMENTS

| | | | |
|---|---|---|---|
| 4,486,788 A | | 12/1984 | Yamada |
| 4,692,879 A | | 9/1987 | Ikuta |
| 5,270,835 A | | 12/1993 | Urabe et al. |
| 5,371,612 A | * | 12/1994 | Sakamoto ...................... 358/3.2 |
| 5,463,471 A | * | 10/1995 | Chou ........................... 358/3.13 |
| 5,685,652 A | * | 11/1997 | Asai ........................... 400/120.07 |
| 5,815,286 A | * | 9/1998 | Matsuba et al. ............. 358/3.19 |
| 6,641,241 B2 | * | 11/2003 | Inoue .............................. 347/15 |
| 6,714,320 B1 | * | 3/2004 | Nakahara et al. ............. 358/3.13 |
| 6,906,825 B1 | * | 6/2005 | Nakahara et al. ............. 358/1.9 |
| 7,457,004 B2 | * | 11/2008 | Asai et al. .................... 358/3.06 |
| 7,508,549 B2 | * | 3/2009 | Tai et al. ....................... 358/3.2 |

(Continued)

FOREIGN PATENT DOCUMENTS

EP    0 593 989    4/1994

(Continued)

OTHER PUBLICATIONS

European Search Report issued Jun. 9, 2009 in connection with counterpart European Application No. 09002044.7.

*Primary Examiner* — King Poon
*Assistant Examiner* — Dung Tran
(74) *Attorney, Agent, or Firm* — Ostrolenk Faber LLP

(57) ABSTRACT

Each of moire elements which are repeat elements of first-order moire appearing by overlaying halftone images of first and second color components is positioned at one of candidate positions arranged at a moire pitch Pm in first and second moire directions orthogonal to each other. In a matrix area of a third color component, dot centers are arranged in a first tilt direction tilted relatively to the first moire direction by an angle of arctan((Pm)/(Pm)) and a second tilt direction orthogonal to the first tilt direction at a pitch of the square root of $((Pm^2)+(Pm^2))$, and a threshold matrix of the color component is generated so that a halftone dot grows from each dot center in accordance with increase of gray level of the color component of the original image. Thus, it is possible to suppress second-order moire appearing in overlaying halftone images of the first to third color components.

18 Claims, 16 Drawing Sheets

U.S. PATENT DOCUMENTS

| | | | |
|---|---|---|---|
| 7,782,493 B2* | 8/2010 | Asai et al. | 358/3.19 |
| 7,821,672 B2* | 10/2010 | Asai | 358/3.09 |
| 2002/0051147 A1* | 5/2002 | Asai | 358/1.9 |
| 2004/0021883 A1* | 2/2004 | Sugizaki | 358/1.9 |
| 2005/0264834 A1* | 12/2005 | Asai et al. | 358/1.9 |
| 2006/0077469 A1* | 4/2006 | Asai et al. | 358/3.06 |
| 2006/0152767 A1* | 7/2006 | Asai et al. | 358/3.23 |
| 2007/0268525 A1* | 11/2007 | Heydinger et al. | 358/3.06 |
| 2008/0074701 A1* | 3/2008 | Asai | 358/3.09 |
| 2008/0192274 A1* | 8/2008 | Sugizaki | 358/1.9 |

FOREIGN PATENT DOCUMENTS

| | | |
|---|---|---|
| EP | 0 748 109 | 12/1996 |
| JP | 52-139501 | 11/1977 |
| JP | 57-171337 | 10/1982 |
| JP | 60-165873 | 8/1985 |
| JP | 6-130656 | 5/1994 |
| JP | 2005-341330 | 12/2005 |
| JP | 2006-014271 | 1/2006 |
| JP | 2006-109324 | 4/2006 |
| JP | 2006-191487 | 7/2006 |

* cited by examiner

THRESHOLD MATRIX GENERATION METHOD, HALFTONE IMAGE GENERATION METHOD, AND HALFTONE IMAGE GENERATING APPARATUS

BACKGROUND OF THE INVENTION

1. Field of the Invention

The present invention relates to a technique for generating threshold matrixes which are compared with a multicolor original image in generating halftone images representing the original image, and also relates to a technique for generating the halftone images representing the multicolor original image.

2. Description of the Background Art

To print an original image of gray scale (i.e., continuous tone), halftone dots are used in many cases. In a generally-used AM (Amplitude Modulated) screening, grayscale representation is made by changing the size of dots which are regularly arranged two-dimensionally at predetermined angles and pitch (accurately, the dots are clusters each of which is a group of dots (or pixels) connecting one another). Halftone images of a plurality of color components where arrangement directions of halftone dots are tilted one another are generated in printing a color original image. For example, in generating halftone images of yellow, cyan, magenta, and black, arrangement directions of halftone dots in the halftone images of respective colors, are tilted relatively to arrangement directions (hereinafter, referred to as "reference arrangement directions") of pixels of the original image by 0, 15, 45, 75 degrees, and thereby, moire appearing by overlaying a plurality of halftone images (especially, second-order moire appearing by overlaying halftone dots of cyan, magenta, and black) is made less obvious.

In generation of a halftone image, generally used is a technique where a threshold matrix in which a plurality of elements are arranged in a row direction and a column direction and a threshold value is assigned to each of the elements is prepared and an original image is compared with the threshold matrix. In this case, since an angle $\Psi$ of arrangement directions of halftone dots relative to the reference arrangement directions is represented by the arctangent of (n/m) (n and m are positive integers equal to 1 or more) (i.e., tan $\Psi$=n/m)), the technique using the threshold matrix is also called as a rational tangent method. In the rational tangent method, it is impossible to set arrangement directions of halftone dots relative to the reference arrangement directions to 15 degrees accurately, and an approximate value is used by changing the angle $\Psi$ to the arctangent of (1/3), (3/11), (5/19), (7/26), or the like (similarly in 75 degrees). In a case where a halftone image where the angle $\Psi$ of arrangement directions of halftone dots relative to the reference arrangement directions becomes the arctangent of (n/m) is generated with the threshold matrix, it is known that ($m^2+n^2$) halftone dots are included in an area in the halftone image corresponding to one threshold matrix (i.e., the minimum size of threshold matrix which is settable) (the relationship between the rational tangent (tan $\Psi$=n/m) and the number of halftone dots is described in, for example, Japanese Patent Application Laid-Open No. 57-171337 (Document 1), page 3, lines 11 to 15 in the upper right column).

If a halftone image of the third color component where halftone dots are arranged in directions tilted relatively to the reference arrangement directions by 45 degrees is overlaid on halftone images of the first and second color components where angles of arrangement directions relative to the reference arrangement directions are approximate values of 15 and 75 degrees, the pitch of halftone dots of the first and second color components being the same as that of the third color component, there is a case where second-order moire easily appears actually (i.e., second-order moire with a long cycle appears). Japanese Patent Application Laid-Open No. 52-139501 (Document 2) discloses a technique for, in the combination of such halftone images, obtaining a pitch of halftone dots in the halftone image of the third color component (the halftone dots arranged in arrangement directions tilted by 45 degrees relatively to the reference arrangement directions) as a value which is capable of suppressing appearance of the second-order moire, by performing a computation using the pitch of halftone dots and angles of the arrangement directions in the halftone images of the first and second color components.

In an apparatus for recording an image on a recording surface where a plurality of irradiation positions of light beams arranged in a predetermined width direction are moved in a main scan direction perpendicular to the width direction, if there is a light beam whose intensity is larger than the other light beams in a case where an angle formed between one of arrangement directions of halftone dots in a halftone image and the main scan direction is set to 0 or 45 degrees, the halftone dots are arranged in the main scan direction (also in a case where the arrangement directions are tilted relatively to the main scan direction by 45 degrees, the halftone dots seem to be arranged in the main scan direction) and large dots (elements of halftone dots) are written at the same positions in the width direction by influence of the light beam, to thereby cause banding unevenness (streak unevenness). Japanese Patent Application Laid-Open No. 6-130656 (Document 3) discloses a technique for setting each of angles formed between arrangement directions of halftone dots and a main scan direction to other than 0 and 45 degrees in halftone images of three color components with suppression of appearance of the second-order moire. Document 3 also discloses a technique for obtaining arrangement directions of moire elements appearing in overlaying two halftone images and a pitch of the moire elements.

Well known is a technique where a threshold arrangement corresponding to one halftone dot where threshold values are arranged two-dimensionally, is prepared, coordinate values in a coordinate system of the threshold arrangement which correspond to respective pixels in an original image, are obtained with predetermined angles and pitch so that halftone dots are arranged at the angles and the pitch in the halftone image, and values of the pixels are compared with threshold values in the coordinate values to generate the halftone image (for example, see Japanese Patent Application Laid-Open No. 60-165873). In this technique, since the angles of arrangement directions of halftone dots are treated as irrational tangents, the technique is also called as an "irrational tangent method".

In the meantime, in overlaying halftone images of three color components, appearance of the second-order moire can be suppressed by using the techniques of Documents 2 and 3, however, in this case, pitches and arrangement directions of halftone dots in halftone images are limited greatly. Therefore, required is a new technique which is capable of determining the pitches and the arrangement directions of halftone dots in the halftone images widely with suppressing the second-order moire.

SUMMARY OF THE INVENTION

The present invention is intended for a threshold matrix generation method of generating threshold matrixes which are compared with a multicolor original image in generating halftone images representing the original image. It is an object of the present invention to provide a new technique which is capable of suppressing second-order moire by interference between first-order moire, which is caused between a halftone image of a first color component and a halftone image of a second color component, and a halftone image of a third color component.

The threshold matrix generation method according to the present invention comprises the steps of: a) setting threshold values in a matrix area of a first color component so that a halftone dot grows from each of a plurality of first dot centers arranged in a halftone image in accordance with increase of gray level of the first color component of an original image, to generate a threshold matrix of the first color component, the plurality of first dot centers being arranged in a first direction and a second direction orthogonal to the first direction in the halftone image, a pitch of the plurality of first dot centers in the first direction being a predetermined value multiple of that in the second direction; b) setting threshold values in a matrix area of a second color component so that a halftone dot grows from each of a plurality of second dot centers arranged in a halftone image in accordance with increase of gray level of the second color component of the original image, to generate a threshold matrix of the second color component, the plurality of second dot centers being arranged in a third direction and a fourth direction orthogonal to the third direction in the halftone image, an angle formed between the third direction and the first direction being equal to or smaller than that formed between the third direction and the second direction, a pitch of the plurality of second dot centers in the third direction being the predetermined value multiple of that in the fourth direction; c) arranging a plurality of third dot centers in a matrix area of a third color component, wherein each of a plurality of moire elements which are repeat elements of first-order moire appearing as periodic repetition of dark and light regions by overlaying a halftone image of the first color component and a halftone image of the second color component which are generated on the assumption that the predetermined value multiple is one time, is positioned at one of a plurality of candidate positions arranged at a moire pitch Pm in both a first moire direction and a second moire direction orthogonal to the first moire direction, and the plurality of third dot centers are arranged in both a first tilt direction tilted relatively to the first moire direction by a tilt angle which is the arctangent of $((N*Pm)/(M*Pm))$ (where M, N are positive integers) and a second tilt direction orthogonal to the first tilt direction, at a pitch which is Ia times or (1/Ia) times the square root of $((M*Pm)^2+(N*Pm)^2)$ (where Ia is a positive integer); d) changing an arrangement of the plurality of third dot centers where a pitch of one direction out of the first tilt direction and the second tilt direction is the predetermined value multiple of a pitch of the other direction, an angle formed between the one direction and the first direction being equal to or smaller than that formed between the one direction and the second direction; and e) setting threshold values in the matrix area of the third color component so that a halftone dot grows from each of the plurality of third dot centers arranged in a halftone image in accordance with increase of gray level of the third color component of the original image, to generate a threshold matrix of the third color component.

According to the present invention, it is possible to suppress the second-order moire by interference between the first-order moire, which is caused between the halftone image of the first color component and the halftone image of the second color component, and the halftone image of the third color component.

Preferably, the predetermined value multiple is one time in the steps a) and b), and the step d) is omitted. It is thereby possible to generate the threshold matrixes easily.

In this case, according to an aspect of the present invention, the threshold matrix generation method further comprises the step of setting threshold values in a matrix area of a fourth color component so that a halftone dot grows from each of a plurality of fourth dot centers arranged in a halftone image in accordance with increase of gray level of the fourth color component of the original image, to generate a threshold matrix of the fourth color component, the plurality of fourth dot centers being arranged in the first moire direction and the second moire direction at the moire pitch in the halftone image. According to another aspect of the present invention, the threshold matrix generation method further comprises the step of setting threshold values in a matrix area of a fourth color component so that a halftone dot grows from each of a plurality of fourth dot centers arranged in a halftone image in accordance with increase of gray level of the fourth color component of the original image, to generate a threshold matrix of the fourth color component, the plurality of fourth dot centers being arranged in both a third tilt direction and a fourth tilt direction orthogonal to the third tilt direction at a pitch in the halftone image, the third tilt direction being tilted relatively to one of two directions in which a plurality of dot centers in one of the first color component and the second color component are arranged at a pitch R, by a tilt angle which is the arctangent of $((K*R)/(J*R))$ (where J, K are positive integers), the pitch of the plurality of fourth dot centers being Ib times or (1/Ib) times the square root of $((J*R)^2+(K*R)^2)$ (where Ib is a positive integer). As a result, it is possible to suppress moire appearing in overlaying the halftone images of the first to fourth color components.

The present invention is also intended for a halftone image generation method of generating halftone images which represent a multicolor original image. The halftone image generation method comprises the steps of: a) generating a halftone image of a first color component in which a halftone dot grows from each of a plurality of first dot centers in accordance with increase of gray level of the first color component of an original image, the plurality of first dot centers being arranged in a first direction and a second direction orthogonal to the first direction in the halftone image, a pitch of the plurality of first dot centers in the first direction being a predetermined value multiple of that in the second direction; b) generating a halftone image of a second color component in which a halftone dot grows from each of a plurality of second dot centers in accordance with increase of gray level of the second color component of the original image, the plurality of second dot centers being arranged in a third direction and a fourth direction orthogonal to the third direction in the halftone image, an angle formed between the third direction and the first direction being equal to or smaller than that formed between the third direction and the second direction, a pitch of the plurality of second dot centers in the third direction being the predetermined value multiple of that in the fourth direction; c) acquiring a first tilt direction, a second tilt direction orthogonal to the first tilt direction and a pitch, wherein each of a plurality of moire elements which are repeat elements of first-order moire appearing as periodic repetition of dark and light regions by overlaying a halftone image of the first color component and a halftone image of the second color component which are generated on the assumption that the predetermined value multiple is one time, is positioned at one of a plurality of candidate positions arranged at a moire pitch Pm in both a first moire direction and a second moire direction orthogonal to the first moire direction, the first tilt direction is tilted relatively to the first moire direction by a tilt angle which is the arctangent of ((N*Pm)/(M*Pm)) (where M, N are positive integers) and the pitch is Ia times or (1/Ia) times the square root of ((M*Pm)² +(N*Pm)²) (where Ia is a positive integer); d) acquiring a changed pitch which is the predetermined value multiple of the pitch acquired in the step c); and e) generating a halftone image of a third color component in which a halftone dot grows from each of a plurality of third dot centers in accordance with increase of gray level of the third color component of the original image, the plurality of third dot centers being arranged in the first tilt direction and the second tilt direction, a pitch of the plurality of third dot centers in one direction out of the first tilt direction and the second tilt direction being the changed pitch where an angle formed between the one direction and the first direction is equal to or smaller than that formed between the one direction and the second direction, a pitch of the plurality of third dot centers in the other direction being the pitch acquired in the step c).

The present invention is still also intended for a halftone image generating apparatus for generating halftone images which represent a multicolor original image.

These and other objects, features, aspects and advantages of the present invention will become more apparent from the following detailed description of the present invention when taken in conjunction with the accompanying drawings.

DESCRIPTION OF THE PREFERRED EMBODIMENTS

First, discussion will be made on a conception of appearance of moire caused by overlaying two halftone images each of which is an image where halftone dots are arranged in two arrangement directions orthogonal to each other. Here, it is considered that halftone dots arranged in two arrangement directions in each halftone image are connected one another with respect to one arrangement direction to form a strip-like pattern (hereinafter, referred to as "strip pattern"), and an arrangement direction of halftone dots in one halftone image corresponds to one arrangement direction of two arrangement directions in the other halftone image which is the direction forming a larger angle with the arrangement direction in the one halftone image (in a case where one arrangement direction in the other halftone image forms an equal angle with each of two arrangement directions in the one halftone image, the arrangement direction in the one halftone image corresponds to an arbitrary arrangement direction in the other halftone image). Then, discussion is made on appearance of moire caused by overlaying strip patterns which extend in arrangement directions corresponding to each other.

Figure 1:
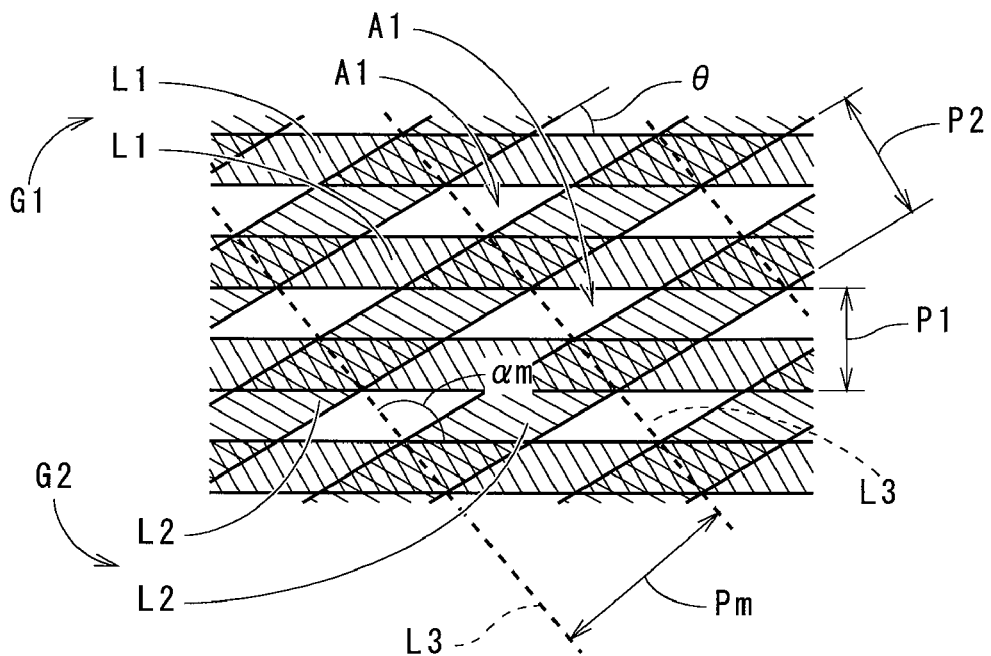
FIG. 1 is a view showing images of two strip patterns which are overlaid each other.

FIG. 1 is a view showing two strip patterns G1, G2 overlaying each other, which correspond to two halftone images. In FIG. 1, the strip patterns G1, G2 are shown by diagonal lines. As shown in FIG. 1, the strip pattern G1 is an arrangement of a plurality of linear elements L1 each of which extends in a horizontal direction of FIG. 1, the plurality of linear elements L1 being arranged at a pitch P1 (in a direction perpendicular to the linear elements L1). The strip pattern G2 is an arrangement of a plurality of linear elements L2 each of which extends in a direction tilted counterclockwise by an angle θ relatively to the linear elements L1, the plurality of linear elements L2 being arranged at a pitch P2 (in a direction perpendicular to the linear elements L2).

As shown in FIG. 1, each of a plurality of (blank) regions Al where the strip patterns G1, G2 do not exist is a parallelogram, and each region Al is positioned on one of a plurality of virtual lines L3 (shown by broken lines in FIG. 1) each of which extends in a direction tilted counterclockwise by an angle a m relatively to the linear elements L1, the plurality of virtual lines L3 being arranged at a pitch Pm (in a direction perpendicular to the virtual lines L3). As described, since blank regions Al are positioned on each virtual line L3, dark and light regions (i.e., moire) which repeatedly appear at the cycle of the pitch Pm are visually identified when an observer observes the image shown in FIG. 1.

Figure 2:
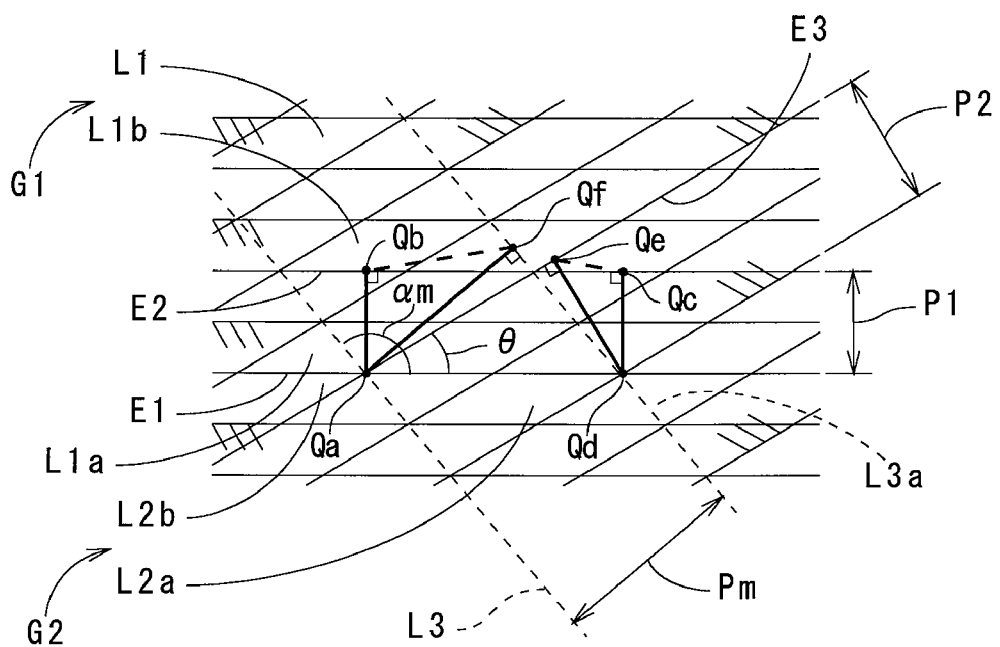
FIG. 2 is a view showing edges of the two strip patterns.

FIG. 2 is a view in which the diagonal lines of the strip patterns G1, G2 in FIG. 1 are omitted (only a small part of the diagonal lines are remained), and edges of the strip patterns G1, G2 are shown by thin lines. In FIG. 2, a vertical line is drawn from an intersection point Qa between an edge E1 of a linear element L1a and a virtual line L3, to a linear element L1b which is adjacent to the linear element L1a on the upper side of FIG. 2, and an intersection point between the vertical line and an edge E2 of the linear element L1b is a point Qb. A vertical line is drawn from the point Qa to a virtual line L3a adjacent to the virtual line L3, and an intersection point between the vertical line and the virtual line L3a is a point Qf.

Further, a vertical line is drawn from an intersection point Qd between the edge E1 of the linear element L1a and the virtual line L3a passing through the point Qf, to the linear element L1b, and an intersection point between the vertical line and the edge E2 of the linear element L1b is a point Qc. A vertical line is drawn from the point Qd to a linear element L2b which is adjacent to a linear element L2a, passing the point Qd, in an upper left direction of FIG. 2, and an intersection point between the vertical line and the linear element L2b is a point Qe.

From FIG. 2, since a triangle formed by joining the points Qa, Qb, Qf and a triangle formed by joining the points Qe, Qc, Qd are similar figures, a ratio of the distance between the points Qa, Qb relative to the distance between the points Qa, Qf becomes equal to that of the distance between the points Qe, Qc relative to the distance between the points Qe, Qd. The distance between the points Qa, Qb is P1, the distance between the points Qa, Qf is Pm, the distance between the points Qe, Qc is sqrt(P1$^2$+P2$^2$−2*P1*P2 cos θ) (where sqrt (A) represents the square root of A, and the same is applied in the following discussion), and the distance between the points Qe, Qd is P2. Thus, the pitch Pm of the virtual lines L3 is represented by Eq. 1.

$$Pm = \frac{P1 \cdot P2}{\sqrt{P1^2 + P2^2 - 2*P1*P2\cos\theta}} \quad \text{(Eq. 1)}$$

The counterclockwise angle αm of the virtual line L3 relative to the linear element L1 is represented by Eq. 2.

$$\text{when } P1\cos\theta \leq P2 \quad \text{(Eq. 2)}$$
$$\alpha m = 90° + \cos^{-1}\left(\frac{Pm\sin\theta}{P2}\right)$$
$$\text{when } P1\cos\theta > P2$$
$$\alpha m = 90° - \cos^{-1}\left(\frac{Pm\sin\theta}{P2}\right)$$

As discussed above, in a case that the strip patterns G1, G2 corresponding to two halftone images are overlaid, dark and light regions repeatedly appear in a direction (hereinafter, referred to as "first moire direction") orthogonal to the direction (the direction of the virtual lines L3) tilted counterclockwise by the angle αm relative to the linear elements L1, at the pitch (hereinafter, referred to as "moire pitch") Pm, and this results in appearance of moire.

In a case where a plurality of halftone dots are arranged in two arrangement directions orthogonal to each other in each halftone image, it is also considered that, by overlaying two halftone images, moire appears by interference between a strip pattern orthogonal to the strip pattern G1 shown in FIG. 1 and a strip pattern orthogonal to the strip pattern G2. In this case, when pitches in the two arrangement directions are equal in each halftone image, the direction where periodic repetition of dark and light regions appears becomes a direction (hereinafter, referred to as "second moire direction") orthogonal to the first moire direction, and the interval (pitch) of the dark and light regions is equal to the moire pitch obtained by Eq. 1.

In the actual halftone image, since a plurality of halftone dots are discretely arranged in two arrangement directions, moire which actually appears as periodic repetition of dark and light regions by overlaying two halftone images (hereinafter, the moire is referred to as "first-order moire") is different from overlaying of the strip patterns. However, a plurality of moire elements which are repeat elements of the first-order moire are at least considered to be arranged at an interval of an integral multiple of the moire pitch Pm in the first and second moire directions. That is to say, each of the plurality of moire elements in the first-order moire appearing by overlaying a halftone image of the first color component and a halftone image of the second color component is positioned at one of a plurality of candidate positions which are arranged in both the first moire direction and the second moire direction orthogonal to the first moire direction at the moire pitch Pm.

In the example of FIG. 1, although the pitches of halftone dots in the overlaid two halftone images are different from each other, in a case where the both pitches are Pe, the moire pitch Pm and the angle αm of the virtual line L3 are represented by Eqs. 3 and 4 which are obtained by modifying Eqs. 1 and 2.

$$Pm = \frac{Pe}{2\sin(\theta/2)} \quad \text{(Eq. 3)}$$

$$\alpha m = 90° + \theta/2 \quad \text{(Eq. 4)}$$

As is obvious from Eq. 4, one of the first and second moire directions is a direction which divides an angle formed between an arrangement direction of halftone dots in the halftone image of the first color component and an arrangement direction of halftone dots in the halftone image of the second color component, which corresponds to the arrangement direction of the first color component (i.e., the arrangement direction of the second color component is the direction forming a larger angle with the arrangement direction of the first color component), into two equally. The following discussion is made based on the premise that each of the plurality of moire elements included in the first-order moire appearing by overlaying the two halftone images is positioned at one of the plurality of candidate positions arranged in the first and second moire directions obtained by Eqs. 2 or 4 at the moire pitch obtained by Eqs. 1 or 3.

Figure 3:
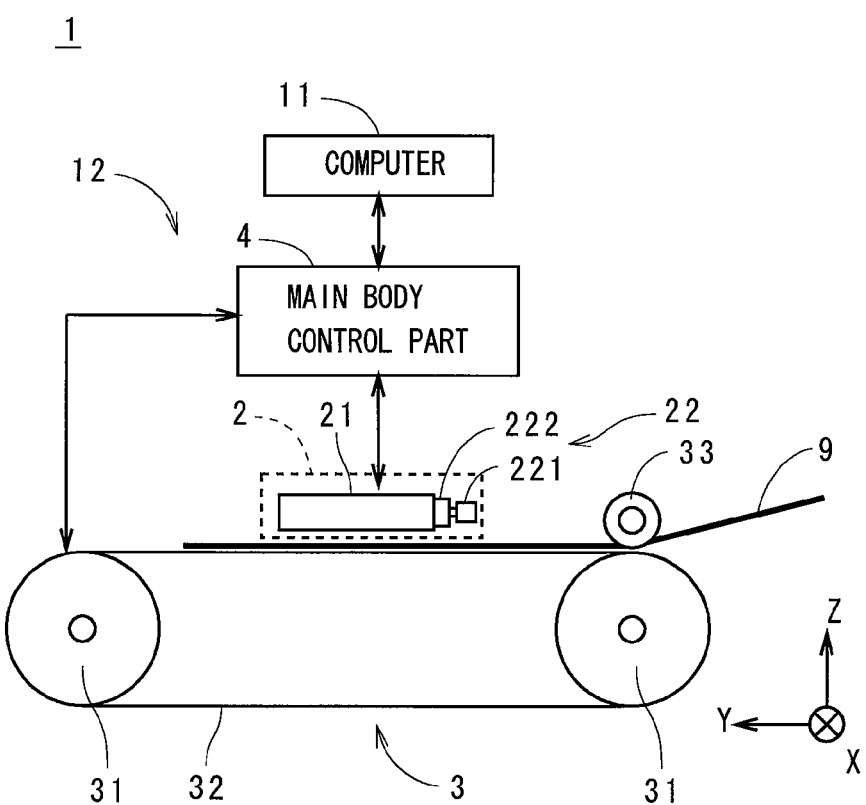
FIG. 3 is a view showing a constitution of a printer.

FIG. 3 is a view showing a construction of an inkjet printer 1 in accordance with the first preferred embodiment of the present invention. The printer 1 is an image recording apparatus for recording images of a plurality of color components on a printing paper 9 where the images are overlapped on the printing paper 9. A main body 12 of the printer 1 has an ejection part 2 for ejecting fine droplets of ink onto the printing paper 9, a feeder 3 for moving the printing paper 9 toward the Y direction of FIG. 3 under the ejection part 2, and a main body control part 4 connected to the ejection part 2 and the feeder 3. A computer 11, which has a CPU for performing various computations, a memory for storing various information and the like, is connected to the main body control part 4. In the printer 1, the main body 12 receives a signal from the computer 11 and prints a color halftone image on the printing paper 9. An object to be printed in the printer 1 may be a film or the like other than the printing paper 9.

The feeder 3 has two belt rollers 31 connected to a not-shown motor and a belt 32 hanging between the two belt rollers 31. The printing paper 9 is roll paper which is continuous paper with a predetermined width. The printing paper 9 is guided onto the belt 32 through a roller 33 positioned above the belt roller 31 on the (−Y) side to be held thereon and moves toward the (+Y) side together with the belt 32, passing under the ejection part 2. One belt roller 31 of the feeder 3 is provided with an encoder (not shown). The feeder 3 may have a construction where a suction part is provided at a position opposite to the ejection part 2 inside the loop-like belt 32 and very small suction holes are formed on the belt 32, to hold the printing paper 9 on the belt 32 by suction.

A head 21 having a plurality of modules arranged in the Y direction is provided in the ejection part 2 and each module can eject ink of one of a plurality of colors. As discussed later, a plurality of outlets each of which ejects fine droplets of ink onto the printing paper 9 (toward the (−Z) direction in FIG. 3) are arranged in the X direction in each module. The ejection part 2 has a head moving mechanism 22 for moving the head 21 in a direction perpendicular to a scan direction of the head 21 and along the printing paper 9 (the direction is the X direction in FIG. 3 and corresponds to the width of the printing paper 9, and the direction is hereinafter referred to as "width direction"). The head moving mechanism 22 is provided with a loop-like timing belt 222 which is long in the X direction, a motor 221 reciprocally moves the timing belt 222 and the head 21 smoothly moves in the width direction. While printing is not performed in the printer 1, the head moving mechanism 22 disposes the head 21 at a predetermined home position and the plurality of outlets in the head 21 are closed with lib members at the home position, to prevent the outlets from being blocked by drying of the ink in the vicinities of the outlets. In the present preferred embodiment, the head 21 ejects ink of first to third color components (e.g., black, cyan, and magenta).

Figure 4:
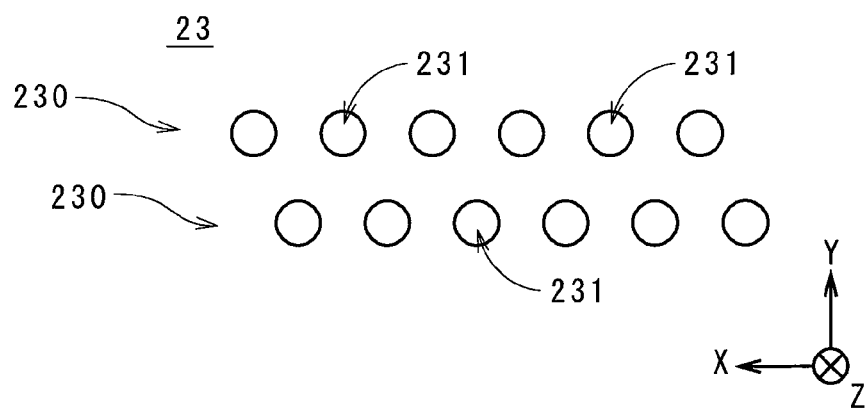
FIG. 4 is a view showing an outlet group.

FIG. 4 is a view showing an outlet group of one module in the head 21. Though the following discussion will be made on only the module for ejecting ink of one of the plurality of colors ejected by the head 21, the modules for ejecting ink of other colors have the same construction.

As shown in FIG. 4, the module 23 has two outlet rows 230 arranged in the Y direction (scan direction) in each of which the plurality of outlets 231 are arranged in the X direction (width direction). In each outlet row 230, the plurality of outlets 231 are arranged at a regular pitch toward the width direction in a plane parallel to the printing paper 9 (the plane parallel to the XY plane). In the module 23, the plurality of outlets 231 are disposed in two-row staggered arrangement so that one of the outlets 231 in one outlet row 230 is positioned at the center between adjacent two outlets 231 in the other outlet row 230 with respect to the width direction. Therefore, in one module 23, the plurality of outlets 231 are arranged at a regular pitch with respect to the width direction (for example, the pitch is 35 micrometers (μm) corresponding to 720 dpi (dot per inch)). Actually, the plurality of outlets 231 are arranged so as to cover the entire printing area on the printing paper 9 with respect to the width direction (i.e., to cover the range which is equal to or wider than the effective print area on the printing paper 9).

Figure 5:
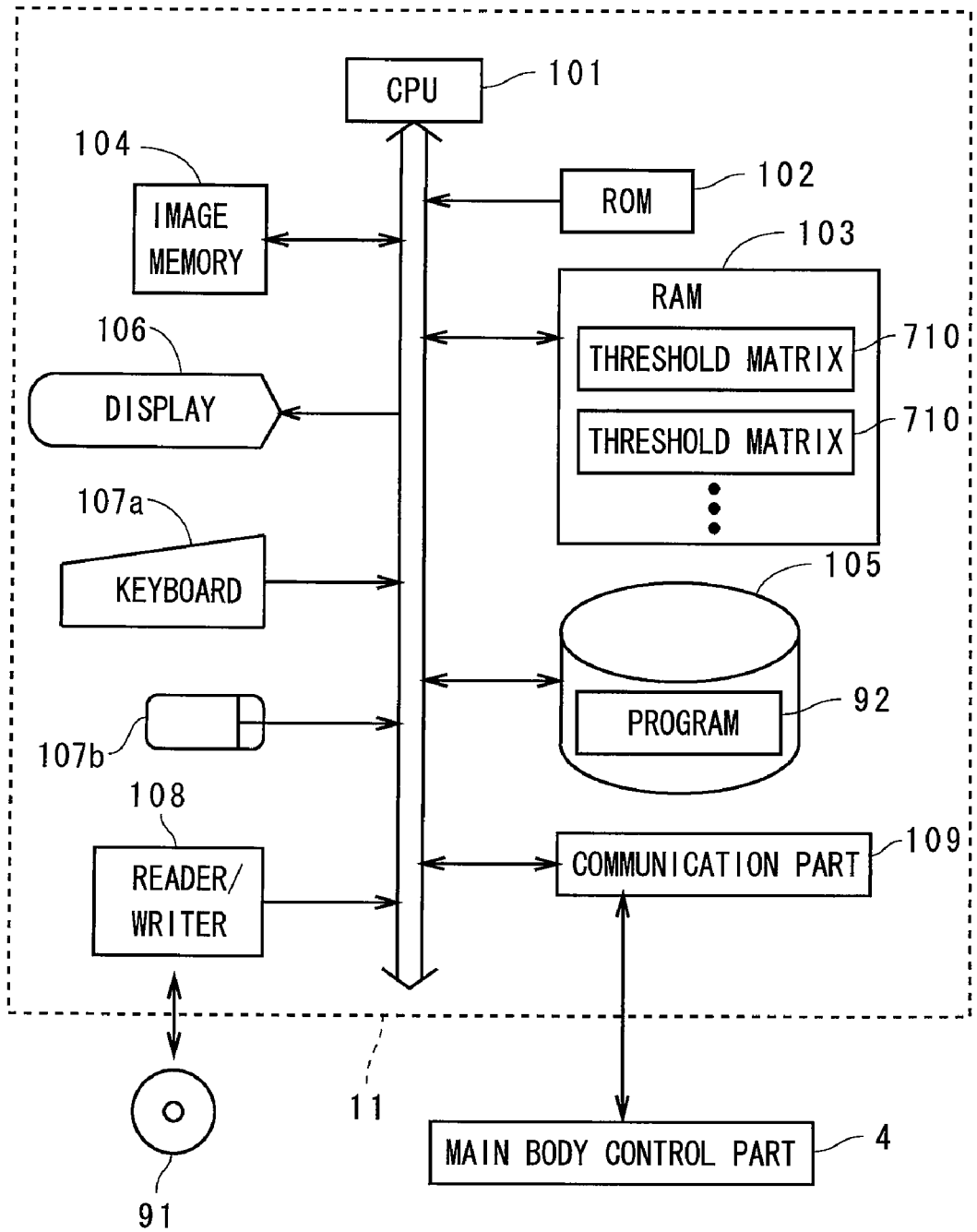
FIG. 5 is a view showing a structure of a computer.

As shown in FIG. 5, the computer 11 has a structure of general computer system where a CPU 101 for performing various computations, a ROM 102 for storing a basic program and a RAM 103 for storing various information are connected to a bus line. To the bus line, an image memory 104 for storing data of a multicolor image (that is to say, each pixel in the image has pixel values of the plurality of color components and hereinafter, the image is referred to as "original image") to be represented by halftone dots (halftoning), a fixed disk 105 for storing information, a display 106 for displaying various information, a keyboard 107a and a mouse 107b for receiving an input from an operator, a reader/writer 108 which reads information from a computer-readable recording medium 91 such as an optical disk, a magnetic disk or a magneto-optic disk and writes information into the recording medium 91, and a communication part 109 for making communications with the main body control part 4 are further connected through interfaces (I/F) as appropriate.

In the computer 11, a program 92 is read out from the recording medium 91 through the reader/writer 108 in advance and stored in the fixed disk 105. The program 92 is copied in the RAM 103, the CPU 101 performs a computation according to the program 92 in the RAM 103 (that is, the computer 11 executes the program), and the computer 11 operates as a matrix generation part for generating a later-discussed threshold matrix (SPM (Screen Pattern Memory) data) 710 for formation of a halftone image for each color component. The threshold matrixes 710 and the data of the original image stored in the image memory 104 are transmitted to the main body control part 4 through the communication part 109.

Figure 6:
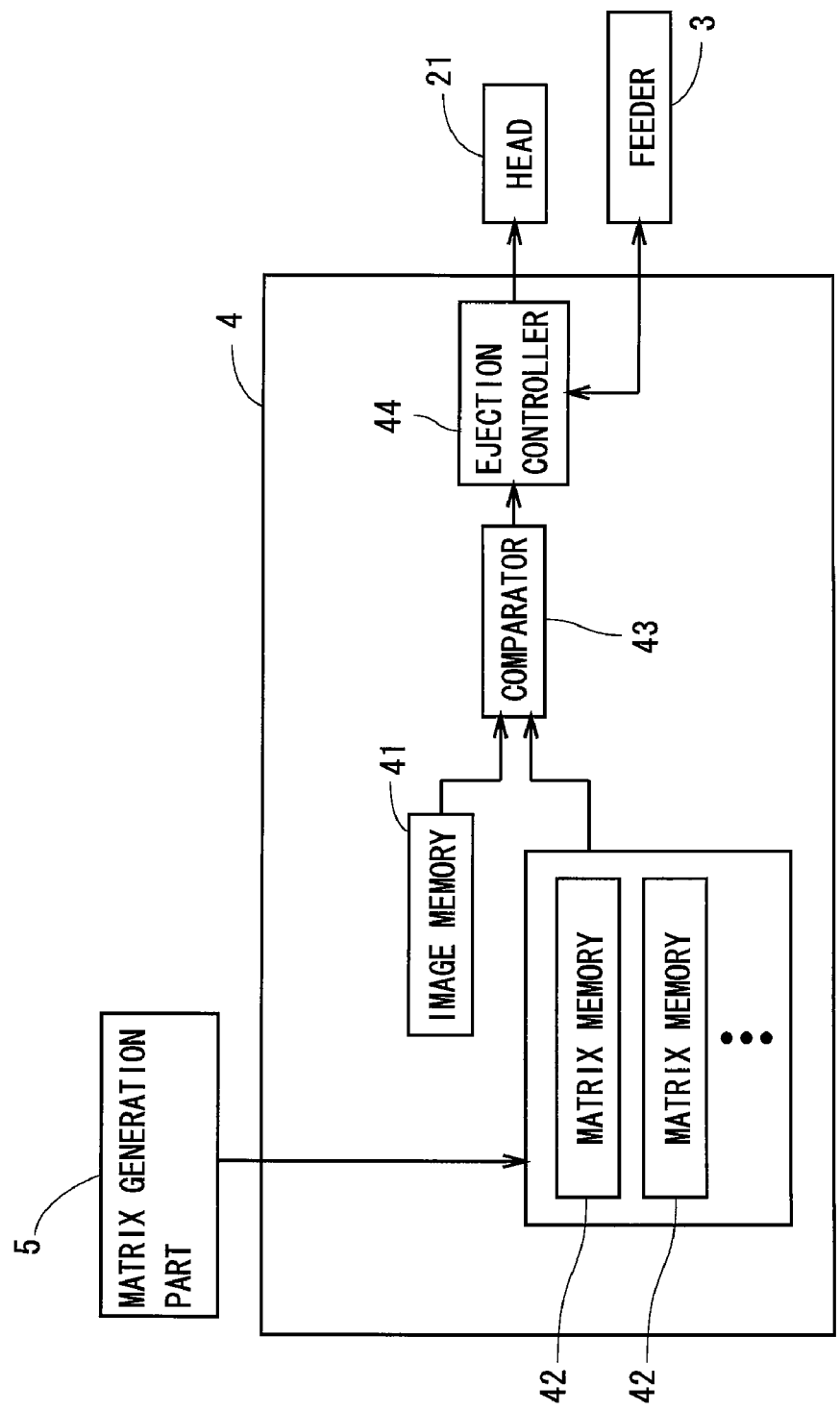
FIG. 6 is a block diagram showing a functional constitution of the printer.

FIG. 6 is a block diagram showing a functional constitution of the printer 1. A function of a matrix generation part 5 in FIG. 6 is achieved by the computer 11. The main body control part 4 has an image memory 41 for storing the data of the multicolor original image, a plurality of matrix memories 42 (SPM (Screen Pattern Memories)) for respectively storing the threshold matrixes 710 of the plurality of color components generated in the matrix generation part 5, a comparator 43 (halftoning circuit) for comparing the original image with the threshold matrix 710 for each color component to generate multicolor halftone image data (hereinafter, also simply referred to as "halftone image"), and an ejection controller 44 for controlling ejection of ink from the plurality of outlets 231 of the head 21 in synchronization with movement of the printing paper 9 relative to the head 21. Generation of the halftone image data may be performed with software by the computer 11 and in this case, the computer 11 serves as an apparatus for generating the halftone image.

Figure 7:
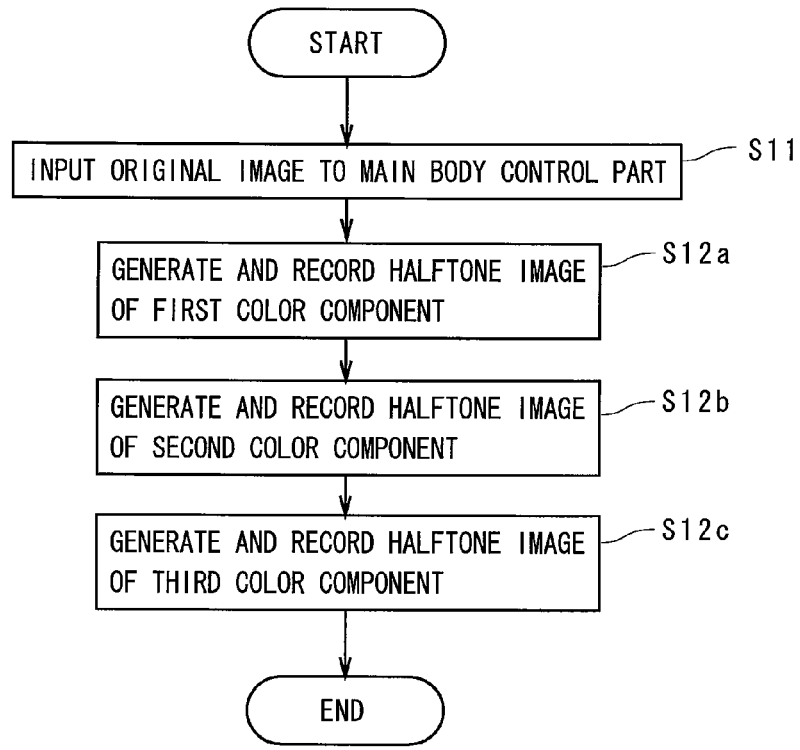
FIG. 7 is a flowchart showing an operation flow for printing an image in the printer.
Figure 8:
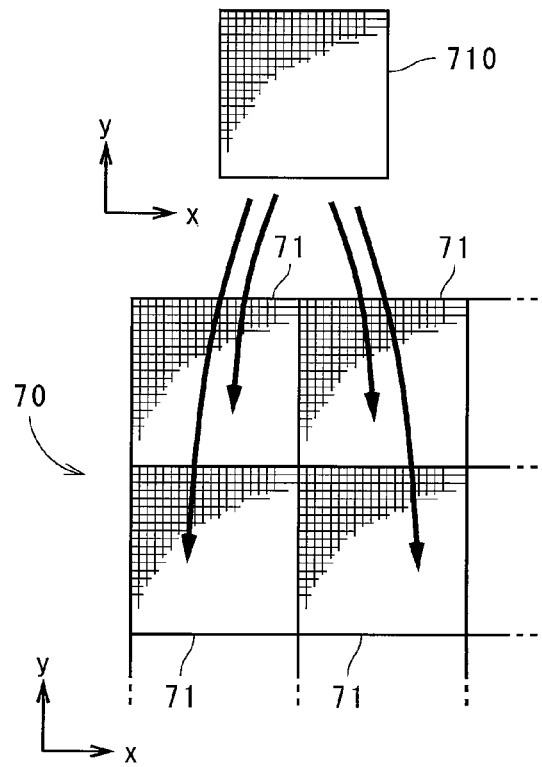
FIG. 8 is a view showing an original image and a threshold matrix.

Next, discussion will be made on an operation for printing an image in the printer 1 referring to FIG. 7. When an image is printed on the printing paper 9 in the printer 1, first, the multicolor original image (e.g., an image represented at gray levels of 0 to 255 in each color component) is inputted to the image memory 41 of the main body control part 4 from the computer 11 and stored therein (Step S11). FIG. 8 is a view abstractly showing the multicolor original image 70 and the threshold matrix 710 of one color component. In each of the original image 70 and the threshold matrix 710, a plurality of pixels or a plurality of elements are arranged in a column direction corresponding to the scan direction (the column direction is shown as the y direction in FIG. 8) and a row direction corresponding to the width direction (the row direction is shown as the x direction in FIG. 8).

After the original image 70 is stored in the image memory 41, the original image 70 is compared with the threshold matrix 710 for each color component to generate a multicolor halftone image representing the original image 70 by the AM screen (that is to say, the multicolor halftone image is a group of halftone images of a plurality of color components). Here, halftoning of the original image 70 is discussed. In halftoning of the original image 70, as shown in FIG. 8, the original image 70 is divided into a large number of areas having the fixed size to set repeat areas 71 each of which serves as a unit in halftoning. Each matrix memory 42 has a memory area corresponding to one repeat area 71 and a threshold value (element value) is set to each address (coordinates) of the memory area to store the threshold matrix 710. Conceptually, each repeat area 71 of the original image 70 and the threshold matrix 710 for each color component are superposed and a pixel value of the color component of each pixel in the repeat area 71 is compared with a threshold value in the threshold matrix 710 corresponding to the pixel value, to thereby determine whether or not writing (formation of a dot of the color) should be performed on the position of the pixel on the printing paper 9.

Actually, a pixel value of one pixel in the original image 70 is read out with respect to each color component from the image memory 41, on the basis of an address signal outputted from an address generator of the comparator 43 in FIG. 6. An address signal representing a position in the repeat area 71 corresponding to the pixel in the original image 70 is also generated in the address generator, one threshold value in the threshold matrix 710 of each color component is specified and read out from the matrix memory 42. The pixel value from the image memory 41 and the threshold value from the matrix memory 42 are compared for each color component in the comparator 43, to determine a pixel value of the position (address) of the pixel in a binary outputted image of each color component. Therefore, looking at one color component, in the grayscale original image 70 shown in FIG. 8, for example, a pixel value "1" is assigned (i.e., a dot is set) at each position where a pixel value is larger than the threshold values of the threshold matrix 710 corresponding to the pixel value, and a pixel value "0" is assigned (i.e., a dot is not set) at each of remaining pixels, to generate the binary outputted image as the halftone image of the above color component.

In the printer 1 of FIG. 3, the head 21 moves to a predetermined printing position in the X direction from the home position by driving the head moving mechanism 22 in parallel with the above process for halftoning. When a portion of the halftone image (for example, the portion corresponding to a plurality of repeat areas 71 at the end on the (+y) side) which is first printed is generated for each color, continuous movement toward the scan direction of the printing paper 9 is started by the feeder 3 which is driven by the main body control part 4 and in parallel with the above process for halftoning (generation process of the halftone image), ejection of ink from the plurality of outlets 231 included in each module 23 is controlled by the ejection controller 44 in synchronization with movement of the printing paper 9 relative to the head 21.

Since the halftone image is printed on the printing paper 9, the plurality of pixels in the halftone image are considered to be arranged on the printing paper 9. The plurality of positions in the row direction in the halftone image of each color component are individually (one by one) associated with the plurality of outlets 231 in the module 23 for the color component. Hence, in the ejection controller 44, in synchronization with movement of the printing paper 9 relative to the head 21, when a pixel value in the halftone image corresponding to an ejection position of each outlet 231 on the printing paper 9 is "1", a dot is formed on the ejection position, and when the pixel value in the halftone image is "0", a dot is not formed on the ejection position. In this way, with respect to each component of the first to third color components, ejection of ink from the plurality of outlets 231 is controlled in accordance with comparison results (i.e., the halftone image data) between the pixel values of the original image 70 at the ejection positions of the plurality of outlets 231 on the printing paper 9 and the threshold values of the threshold matrix 710 corresponding to the pixel values, while moving the plurality of ejection positions on the printing paper 9 which individually correspond to the plurality of outlets 231 relatively to the printing paper 9 in the scan direction.

In the printer 1, an operation for recording a halftone image of the first color component on the printing paper 9 while generating the halftone image (Step S12a), an operation for recording a halftone image of the second color component on the printing paper 9 while generating the halftone image (Step S12b), and an operation for recording a halftone image of the third color component on the printing paper 9 while generating the halftone image (Step S12c) are performed in parallel to print a multicolor halftone image representing the original image on the printing paper 9. After the whole halftone image is printed on the printing paper 9, movement of the printing paper 9 toward the scan direction is stopped and the head moving mechanism 22 moves the head 21 to the home position, to complete the printing operation in the printer 1.

Next discussion will be made on a technique for generating threshold matrixes used in the printer 1 referring to FIG. 9. In the matrix generation part 5, first, set is a matrix area of the first color component, which is an area for storing a threshold matrix of the first color component and defined in the column direction corresponding to the scan direction and the row direction corresponding to the width direction. A plurality of dot centers 811 are regularly arranged two-dimensionally in a matrix area 801 as shown in FIG. 10. FIG. 10 shows a rectangle 810 with a predetermined size where each side extends along an arrangement direction of the plurality of dot centers 811 so that the arrangement of the dot centers 811 can be visually recognized, and FIG. 10 only shows the dots centers 811 arranged in the rectangle 810. Typically, however, the actual matrix area 801 is an area where the sizes in two directions orthogonal to each other, that is the row direction and the column direction, are equal (the two directions are represented as the x direction and the y direction in FIG. 10) (the same is applied in FIG. 11, FIGS. 20 to 22 discussed later).

A dot center is a position in a matrix area corresponding to the center of a halftone dot in a halftone image of each color component, the halftone dot growing in accordance with increase in gray level of the color component of the original image. The plurality of dot centers 811 in FIG. 10 are arranged in two arrangement directions (directions shown by arrows x1 and y1 in FIG. 10) orthogonal to each other at an equal pitch Pe. The x1 direction and the y1 direction are tilted relatively to both of the row direction and the column direction, and the x1 direction is tilted counterclockwise by an angle $\Phi 1$ which is the arctangent of (s/t) (s and t are positive integers) relatively to the x direction (hereinafter, also referred to as "reference direction") (i.e., $\phi 1 = \arctan(s/t)$). In the preferred embodiment, s and t are 3 and 11, respectively, and $\phi 1$ is about 15 degrees. In the following description, the dot centers arranged in the matrix area 801 of the first color component are referred to as "first dot centers 811" (the same is applied in dot centers of the second and third color components discussed later).

After the plurality of first dot centers 811 are arranged in the matrix area 801 of the first color component, for example, a threshold value is set at each of positions in the matrix area 801 so that a greater value is assigned to the position as the distance between the position and the nearest first dot center 811 is longer. As described, a threshold value is set at each of positions in the matrix area 801 so that a halftone dot grows from a position in the halftone image (i.e., the image generated with the threshold matrix mentioned below) corresponding to each first dot center 811 (the position is also referred to as "first dot center") in accordance with increase of gray level of the first color component of the original image, to generate a threshold matrix of the first color component (Step S21). If a halftone dot grows with its center lying on each first dot center in the halftone image, setting of a threshold value at each position in the matrix area 801 may be performed by another technique.

Figure 11:
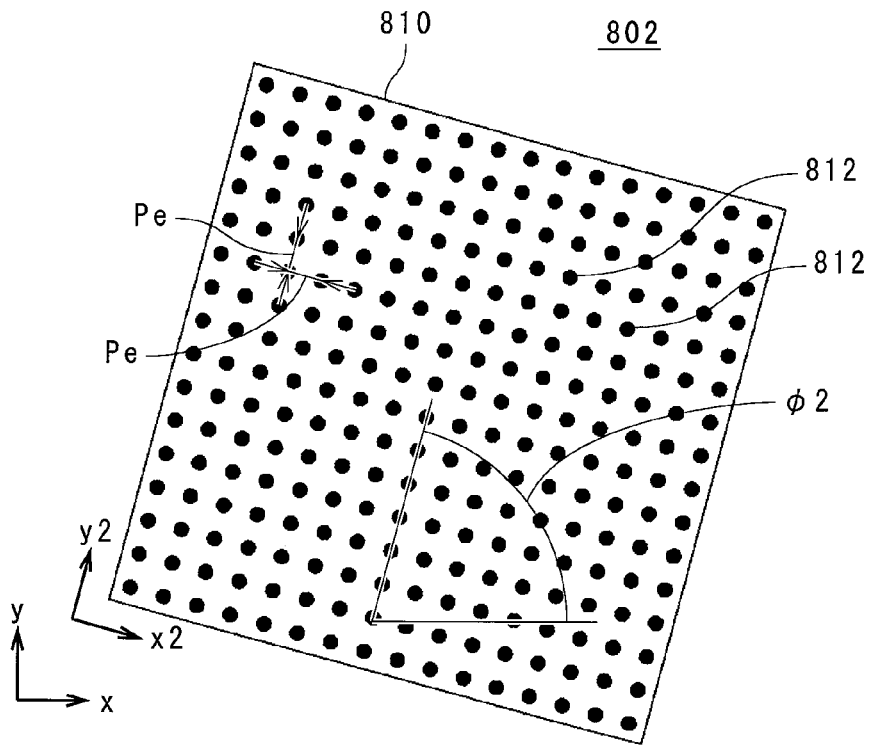
FIG. 11 is a view showing a matrix area of a second color component.

Subsequently, a matrix area of the second color component which is an area where a threshold matrix of the second color component is stored and defined in the row direction and the column direction similarly to the matrix area of the first color component, is set in the matrix generation part 5. As shown in FIG. 11, a plurality of second dot centers 812 are arranged in two arrangement directions orthogonal to each other (directions represented by arrows x2 and y2 in FIG. 11) in a matrix area 802, at the pitch Pe which is the same as that in the first dot centers 811 of the first color component. The x2 direction and the y2 direction are tilted relatively to both of the row direction and the column direction in FIG. 11 (represented as the x direction and the y direction in FIG. 11), and the y2 direction is tilted counterclockwise by an angle φ2 which is the arctangent of (t/s) relatively to the reference direction (x direction) (i.e., φ2=arctan(t/s)=90 degrees-arctan(s/t))). As described earlier, s and t are 3 and 11, respectively, and φ2 is about 75 degrees in the preferred embodiment.

After the plurality of second dot centers 812 are arranged in the matrix area 802 of the second color component, a threshold value is set at each of positions in the matrix area 802 so that a halftone dot grows from a position in the halftone image corresponding to each second dot center 812 (the position is also referred to as "second dot center") in accordance with increase of gray level of the second color component of the original image, similarly to the generation process of the threshold matrix of the first color component, to thereby generate a threshold matrix of the second color component (Step S22).

After generation of the threshold matrixes of the first and second color components, an angle (φ2−φ1) formed between the x1 direction which is one arrangement direction of the first dot centers 811 of the first color component and the y2 direction out of the two arrangement directions of the second dot centers 812 of the second color component, the y2 direction forming a greater angle with the x1 direction (in a case where angles formed between the x1 direction and each of the x2 direction and the y2 direction are equal, one of the x2 direction and the y2 direction is selected) and the pitch Pe of the first and second dot centers 811, 812, are substituted for the above Eq. 3, and a moire pitch Pm is represented by Eq. 5. θ in Eq. 3 is represented as (φ2−φ1). And also, hereinafter, an angle formed between two directions means a smaller angle out of two angles formed between the two directions.

$$Pm = \frac{Pe}{2\sin((\phi 2 - \phi 1)/2)} \quad \text{(Eq. 5)}$$

$$= \frac{Pe}{2\sqrt{1 - \cos^2((\phi 2 - \phi 1)/2)}}$$

$$= \frac{Pe}{2\sqrt{1 - (1 + \cos(\phi 2 - \phi 1))/2}}$$

$$= \frac{Pe}{2\sqrt{(1 - \cos(\phi 2 - \phi 1))/2}}$$

$$= \frac{Pe}{2\sqrt{(1 - \cos\phi 2 \cos\phi 1 - \sin\phi 2 \sin\phi 1)/2}}$$

Since sin φ1, sin φ2, cos φ1 and cos φ2 become (s/sqrt($s^2$+$t^2$)), (t/sqrt($s^2$+$t^2$)) (t/sqrt($s^2$+$t^2$)) and (s/sqrt($s^2$+$t^2$)), respectively, the moire pitch Pm in Eq. 5 is represented by Eq. 6. In the preferred embodiment where s and t are 3 and 11, respectively, the moire pitch Pm is sqrt(130/128) times the pitch Pe of the first and second dot centers 811, 812.

$$Pm = \frac{Pe\sqrt{s^2 + t^2}}{\sqrt{2(s-t)^2}} \quad \text{(Eq. 6)}$$

As discussed above, θ in Eq. 4 is represented as the angle (φ2−φ1) formed between the x1 direction and the y2 direction, a counterclockwise angle φm of the direction corresponding to the virtual line L3 in FIG. 1 respective to the reference direction (x direction), becomes an angle which is obtained by adding φ1 to αm in Eq. 4, that is, (90 degrees+ (φ1+φ2)/2). Therefore, in the preferred embodiment where s and t are 3 and 11, respectively, a counterclockwise angle of the direction corresponding to the virtual line L3 in FIG. 1 relative to the reference direction becomes 135 degrees, and the first and second moire directions are obtained as directions tilting relatively to the x direction by 45 degrees and 135 degrees counterclockwise.

After acquisition of the first and second moire directions and the moire pitch Pm, a matrix area of the third color component which is an area where a threshold matrix of the third color component is stored and defined in the row and column directions similarly to the matrix area of the first color component, is set in the matrix generation part 5. In the preferred embodiment, the third color component is black.

Figure 12:
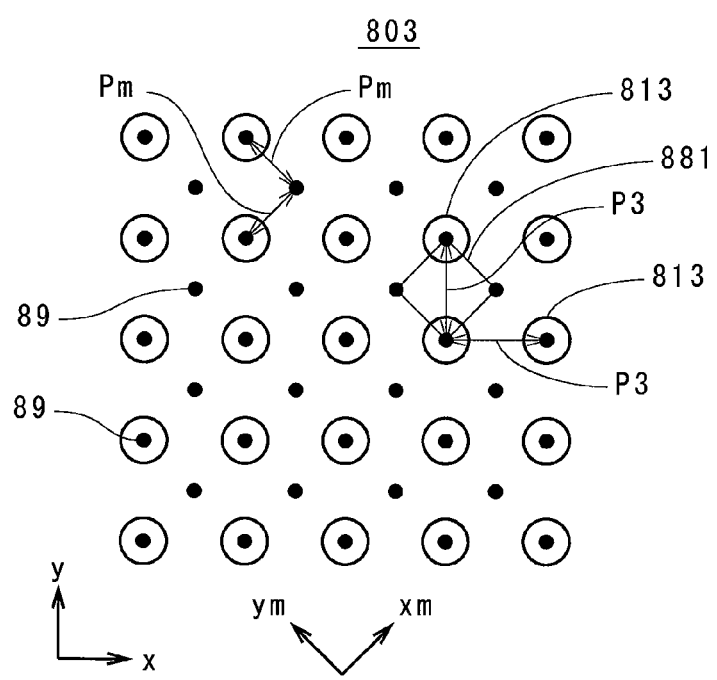
FIG. 12 is a view showing a matrix area of a third color component.

FIG. 12 is a view showing a part of a matrix area 803 of the third color component. In FIG. 12, a plurality of candidate positions which are arranged in the first and second moire directions (directions represented by arrows xm and ym in FIG. 12) at the moire pitch Pm, are shown by dots 89. As discussed above, the plurality of candidate positions 89 represent candidates of positions where the plurality of moire elements are arranged, the plurality of moire elements being the repeat elements of the first-order moire appearing as periodic repetition of dark and light regions by overlaying the halftone image generated with the threshold matrix of the first color component and the halftone image generated with the threshold matrix of the second color component.

Subsequently, in a matrix area 803 of FIG. 12, a plurality of third dot centers 813 (represented by circles in FIG. 12 and the same is applied in FIG. 17 discussed later) are arranged in two directions of diagonal lines of the minimum square (rectangle) 881 which is formed by four candidate positions 89 out of the plurality of candidate positions 89, at a pitch P3 which is the length of the diagonal lines (i.e., the two directions are directions tilted relatively to the first and second moire directions and hereinafter, referred to as "first tilt direction" and "second tilt direction") (Step S23). In other words, the plurality of third dot centers 813 are arranged both in the first tilt direction tilted relatively to the first moire direction (xm direction) by a tilt angle of 45 degrees (=arctan(Pm/Pm)) which is the arctangent of (Pm/Pm) and the second tilt direction orthogonal to the first tilt direction, at the pitch P3 which is the square root of ($Pm^2$+$Pm^2$) (i.e., at the pitch P3 which is sqrt(2) times the moire pitch Pm). In the preferred embodiment, the first and second tilt directions are parallel to the y direction and the x direction in FIG. 12, respectively. In the following description, the pitch of the third dot centers in the first and second tilt directions is referred to as the "third pitch".

After the plurality of third dot canters 813 are arranged in the matrix area 803 of the third color component, similarly to the generation process of the threshold matrix of the first color component, a threshold value is set at each of positions in the matrix area 803 so that a halftone dot grows from a position in the halftone image corresponding to each third dot center 813

(the position is also referred to as "third dot center") in accordance with increase of gray level of the third color component of the original image, to thereby generate a threshold matrix of the third color component (Step S24).

Considering the case where the number of elements in each of the row and column directions in the threshold matrix of each color component is 128 (i.e., the matrix area is the size of 128 rows and 128 columns), the plurality of first dot centers 811 are arranged in the direction which is counterclockwise tilted by the angle $\phi 1$ (=arctan(3/11)) with respect to the reference direction and the direction orthogonal to the above direction in the matrix area 801 of the first color component in the process of Step S21, as described earlier. At this time, it is known that 130 (=$11^2+3^2$) first dot centers 811 can be arranged in the matrix area (see Japanese Patent Application Laid-Open No. 57-171337 (Document 1) which describes the relationship between the rational tangent and the number of halftone dots, and the disclosure of which is herein incorporated by reference.).

Similarly, 130 second dot centers 812 are arranged in the direction which is counterclockwise tilted by the angle $\phi 2$ (=arctan(11/3)) with respect to the reference direction and the direction orthogonal to the above direction in the matrix area 802 of the second color component in the above process of Step S22. In this case, in each of the matrix areas 801, 802 of the first and second color components, dot centers 811, 812 are arranged in the two arrangement directions at the pitch Pe which is equivalent to approximate 11.2 (=sqrt(128*128/130)) elements, and the moire pitch Pm derived from the threshold matrixes of the first and second color components is obtained as sqrt(130/128) times the pitch Pe, that is, the distance corresponding to approximate 11.3 (=sqrt(128)) elements in the process of Step S23.

Then, the third pitch of the third dot centers 813 in the first and second tilt directions (the x direction and the y direction) in the matrix area 803 of the third color component is obtained as the distance corresponding to 16 (=sqrt(128)*sqrt(2)) elements in the process of Step S24, and 64 (=$(128/16)^2$) third dot centers 813 are included in the matrix area 803 with a size of 128 rows and 128 columns.

Figure 13:
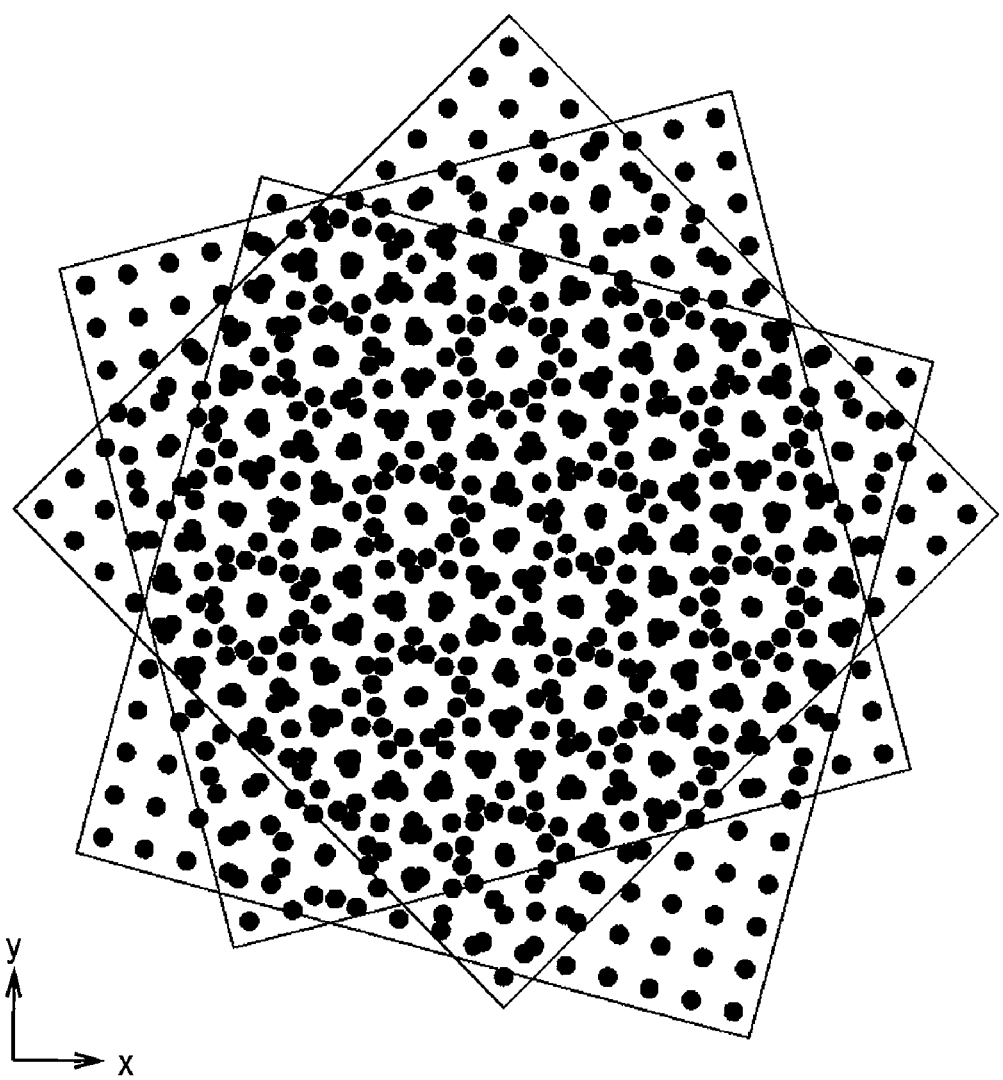
FIG. 13 is a view showing halftone images of three color components overlaid one another in an example for comparison.
Figure 14:
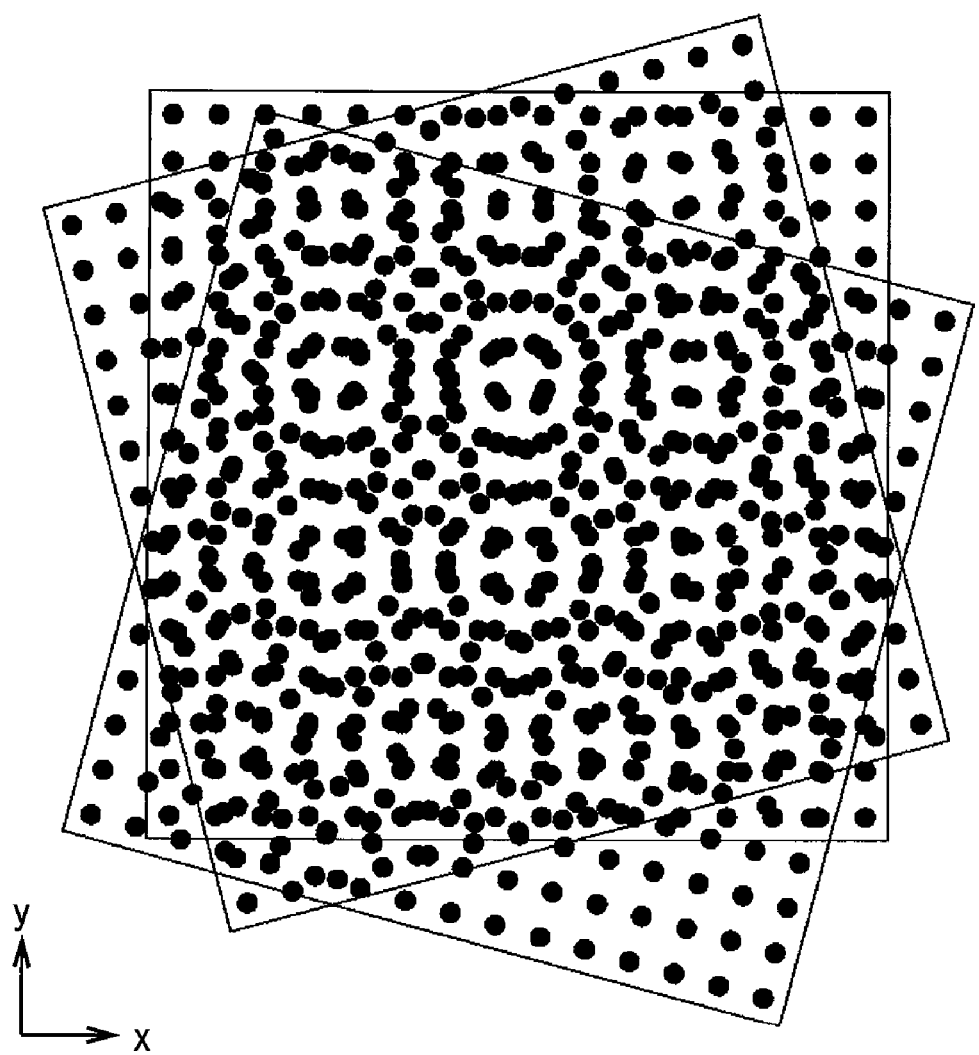
FIG. 14 is a view showing halftone images of the three color components overlaid one another in another example for comparison.

Generally, in suppressing appearance of moire by overlaying the halftone images of the three color components, the arrangement directions of the dot centers in the halftone images of the three color components are made to be different from one another by 30 degrees, for example the angles of the arrangement directions relative to the reference direction are determined as 15, 45, 75 degrees, and the pitches of the dot centers in the halftone images of the three color components are made equal to one another, like in FIG. 13 where the halftone images of the three color components are overlaid. If the angles of the arrangement directions in the halftone images of the three color components relative to the reference direction are determined as 0, 15, 75 degrees as shown in FIG. 14, periodic repetition of dark and light regions by overlaying the halftone images of the three color components (i.e., the second-order moire by interference between the first-order moire, which is caused between the halftone image of the first color component and the halftone image of the second color component, and the halftone image of the third color component), appears at relatively large cycle, and such second-order moire can be easily recognized by an observer (the second-order moire easily appears). In FIGS. 13 and 14, although the outer form of each halftone image is made rectangle where each side is along the arrangement direction and the arrangement direction of halftone dots in the halftone image can be easily recognized, actually, the outer form of the halftone image of each color component is rectangle formed by sides which are parallel to or orthogonal to the reference direction (the same is applied in FIGS. 15, 16 and, 23). These figures are in binary representation of white and black without distinction of actual colors.

Figure 9:
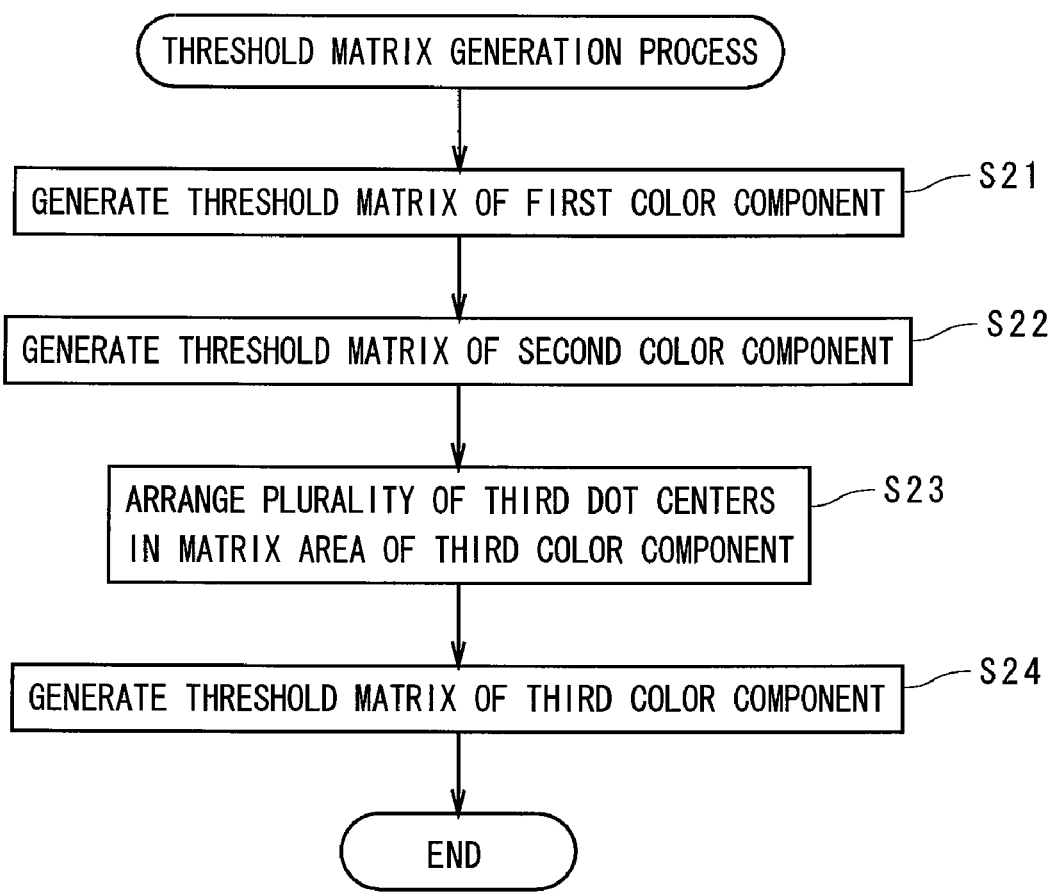
FIG. 9 is a flowchart showing a process flow for generating threshold matrixes.
Figure 10:
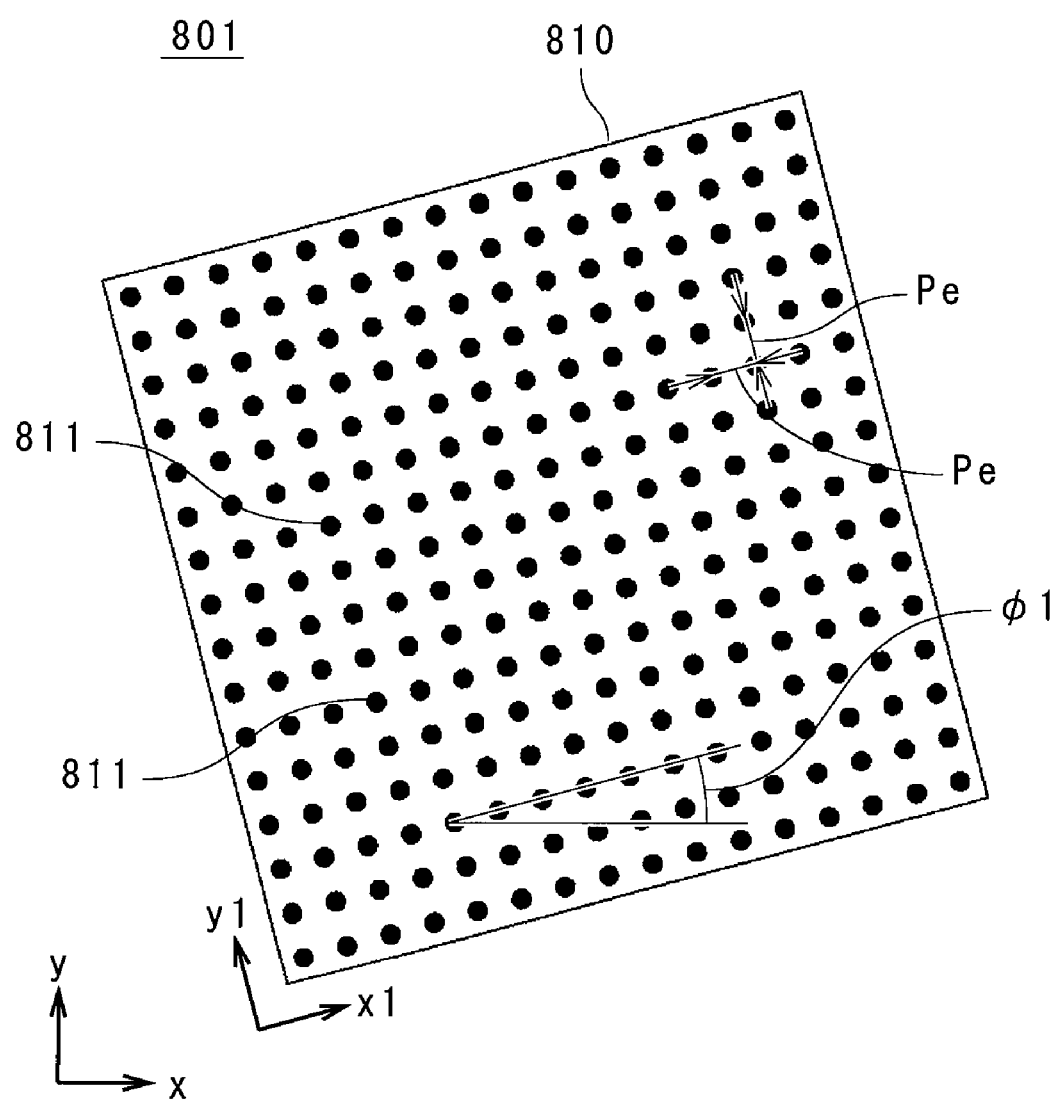
FIG. 10 is a view showing a matrix area of a first color component.
Figure 15:
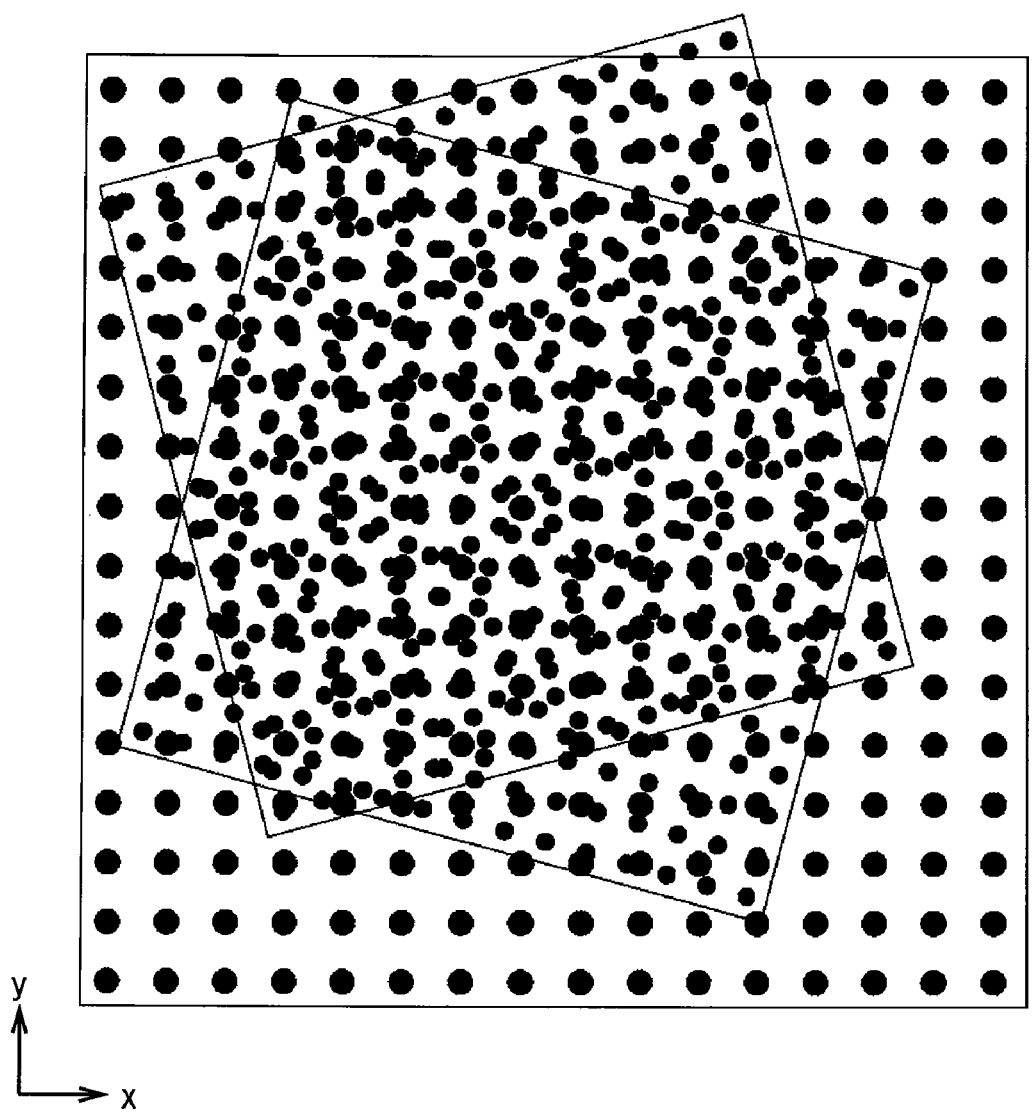
FIG. 15 is a view showing halftone images of the three color components overlaid one another.

On the other hand, in the threshold matrix generation process of FIG. 9, the pitch of the third dot centers 813 is made equal to twice the moire pitch with respect to each of the first and second moire directions in generating the threshold matrix of the third color component (see FIG. 12), and frequency components of the first-order moire are made to be approximate to those of the halftone image of the third color component (i.e., many frequency components of the first-order moire are made to coincide with those of the halftone image of the third color component). Thus, in a case where the original image is represented by halftone dots with using the threshold matrixes generated in the present threshold matrix generation process and the generated halftone images of the three color components are overlaid as shown in FIG. 15, it is possible to prevent appearance of strong second-order moire (second-order moire where the pitch (cycle) of repeat elements is a finite length and long, and for example, the pitch in a printed image is over 1 millimeter) and suppress the second-order moire (i.e., it is possible to shorten the cycle of the second-order moire to the extent that the observer cannot recognize it, and to make the second-order moire less obvious). A plurality of halftone images shown in FIG. 15 are halftone images which are obtained by rotating a specific halftone image out of the plurality of halftone images shown in FIG. 13 by 45 degrees, and the pitch of halftone dots in arrangement directions of the specific halftone image is sqrt(2) times the moire pitch derived from the other two halftone images.

In the printer 1, normally, though print unevenness such as longitudinal streaks easily appears in a printed image of black, since the third pitch of the third dot centers 813 in the halftone image of black is made larger than each of the pitches of the first and second dot centers 811, 812 in the halftone images of the other color components in the preferred embodiment, it is possible to make the screen ruling of black (the pitch of dot centers) coarse and suppress print unevenness such as longitudinal streaks (make print unevenness less obvious) in the printed image, caused by the image of black.

In the above process, the plurality of third dot centers 813 are arranged in the first and second tilt directions at the pitch which is sqrt(2) times the moire pitch Pm in the third matrix area 803. However, there may be a case where the plurality of third dot centers 813 are arranged in the first and second tilt directions at a pitch of an integral multiple (two or more multiples) of a value which is sqrt(2) times the moire pitch Pm, depending on a recording resolution in the printer 1 (the number of dots per unit length), an observation distance of a printed matter which is created in the printer 1, or the like. Also in this case, since the pitch of the third dot centers 813 is made equal to an integral multiple of the moire pitch with respect to each of the first and second moire directions, it is possible to prevent appearance of the strong second-order moire which is unexpected.

The plurality of third dot centers 813 may be arranged in the first and second tilt directions at a pitch which is sqrt(2)/2 times the moire pitch Pm. In this case, when the number of elements in each of the row and column directions in the threshold matrix of each color component is 128 similarly to the above case, the third pitch of the third dot centers 813 in the first and second tilt directions in the matrix area 803 of the third color component is obtained as the distance corresponding to 8 (=sqrt(128)/sqrt(2)) elements and 256 (=$(128/8)^2$)

third dot centers 813 are included in the matrix area 803 with the size of 128 rows and 128 columns.

Figure 16:
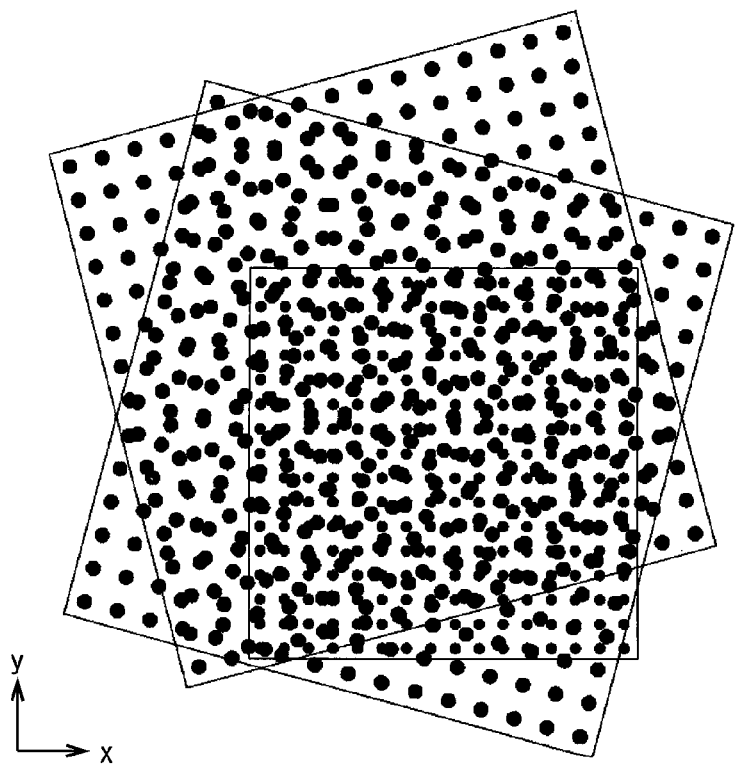
FIG. 16 a view showing another example of the halftone images of the three color components.

FIG. 16 is a view showing the halftone images of the third color components overlaying one another, the halftone images being generated with the threshold matrixes. In the case where the pitch of the third dot centers 813 is sqrt(2)/2 times the moire pitch Pm, since the pitch of the third dot centers 813 is equal to the moire pitch with respect to each of the first and second moire directions, it is possible to prevent appearance of the strong second-order moire which is unexpected.

A plurality of halftone images shown in FIG. 16 are halftone images which are obtained by rotating a halftone image of a specific color component out of the plurality of halftone images shown in FIG. 13 by 45 degrees, and the pitch of halftone dots in arrangement directions of the halftone image is 1/sqrt(2) times the moire pitch derived from the other two halftone images. Therefore, in a case where reproduction in detail of the specific color component is improved, such threshold matrix is used for the color component and it is therefore possible to suppress overlaying moire with making the screen ruling of the color component fine in a multicolor halftone image. Naturally, the plurality of third dot centers 813 may be arranged in the first and second tilt directions at a pitch which is β times, β being a fraction of an integer (two or more), the value which is sqrt(2) times the moire pitch Pm.

Figure 17:
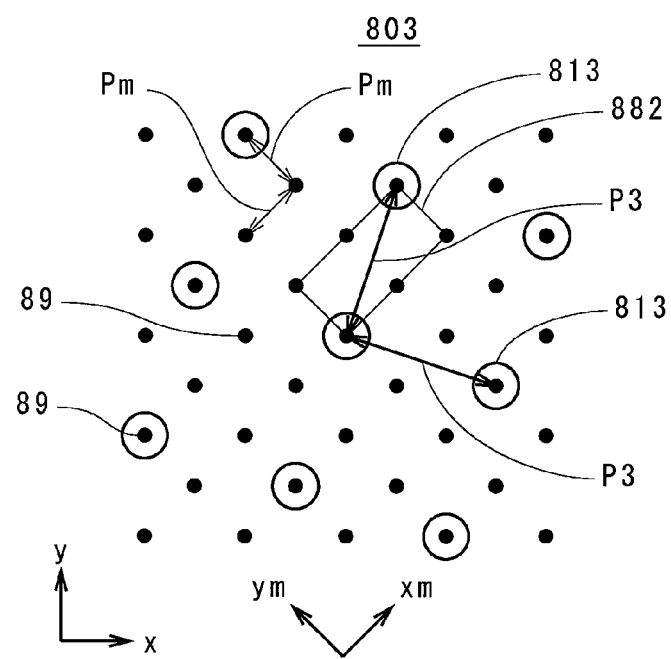
FIG. 17 is a view showing a matrix area of the third color component.

Further, in a case where a plurality of candidate positions 89 are arranged in the first and second moire directions (i.e., the xm direction and the ym direction) at the moire pitch Pm in the matrix area 803 of the third color component as shown in FIG. 17, there may be a case where a direction of one diagonal line of an outer form (a thin-lined rectangle 882 in FIG. 17) formed by two (minimum) squares which share one side and a direction orthogonal to the direction, are determined as the first and second tilt directions, and the plurality of third dot centers 813 are arranged in the first and second tilt directions at a third pitch P3 which is equivalent to the length of the diagonal line. In this case, a tilt angle of the first tilt direction relative to the first moire direction (the xm direction) is the arctangent of (Pm/2Pm), and the third pitch P3 of the third dot centers 813 is the square root of $(Pm^2+(2Pm)^2)$ (i.e., the third pitch P3 is sqrt(5) times the moire pitch Pm). Also in a case where the third dot centers 813 are arranged in such a manner, since the pitch of the third dot centers 813 is made equal to an integral multiple of the moire pitch with respect to each of the first and second moire directions, it is possible to prevent appearance of the strong second-order moire which is unexpected.

As discussed above, the plurality of third dot centers 813 are arranged both in the first tilt direction tilted relatively to the first moire direction by a tilt angle which is the arctangent of ((N*Pm)/(M*Pm)) (where M, N are positive integers) and the second tilt direction orthogonal to the first tilt direction, at the third pitch which is Ia times or (1/Ia) times the square root of $((M*Pm)^2+(N*Pm)^2)$ (where Ia is a positive integer) in the matrix area 803 of the third color component, and it is therefore possible to determine a pitch or arrangement directions of halftone dots in the halftone image of the third color component widely while adjusting the pitch of the third dot centers 813 with respect to each of the first and second moire directions so that the strong second-order moire does not appear in overlaying the first to third halftone images.

From the view point of shortening the cycle of the second-order moire to the extent that the observer cannot recognize it, it is preferable that the third pitch of the third dot centers 813 in the first and second tilt directions is as large as or smaller than sqrt(10) times the moire pitch Pm, and it is more preferable that the third pitch is as large as or smaller than sqrt(5) times the moire pitch Pm. Practically, it is preferable the third pitch is as large as or larger than ¼ times the moire pitch Pm.

In the above process, the angle φ1 of one arrangement direction of the first dot centers 811 relative to the reference direction in the matrix area 801 of the first color component is about 15 degrees and the angle φ2 of the arrangement direction corresponding to the one arrangement direction of the first dot centers 811 (the arrangement direction forming a greater angle with the above one arrangement direction of the first dot centers 811) relative to the reference direction in the matrix area 802 of the second color component is about 75 degrees. However, the angles φ1, φ2 can be various values. Following discussion is made on an example where the angle φ1 of one arrangement direction (the x1 direction) of the first dot centers 811 relative to the reference direction is the arctangent of (7/17) (about 22.1 degrees) and the angle φ2 of the arrangement direction of the second dot centers 812 corresponding to the x1 direction, relative to the reference direction is the arctangent of (7/1) (about 82.1 degrees) (where the pitch Pe of the first dot centers 811 is equal to that of the second dot centers 812).

The table 1 of Japanese Patent Application Laid-Open No. 6-130656 (Document 3) shows combinations of values of m1, n1, m2, n2, m3, n3 where in a case where the angle φ1 of one arrangement direction of first dot centers relative to the reference direction is the arctangent of (m1/n1) (where m1, n1 are positive integers) and the angle φ2 of an arrangement direction of second dot centers corresponding to the one arrangement direction, relative to the reference direction is the arctangent of (m2/n2) (where m2, n2 are positive integers), angles of a moire direction relative to the reference direction with respect to combinations of m1, n1, m2, n2 can be also represented as the arctangent of (m3/n3) (where m3, n3 are positive integers), and the disclosure of which is herein incorporated by reference.

As discussed above, in a case where the angle φ1 of one arrangement direction (the x1 direction) of the first dot centers 811 is the arctangent of (7/17) and the angle φ2 of the arrangement direction of the second dot centers 812 corresponding to the x1 direction is the arctangent of (7/1), sin φ1, sin φ2, cos φ1 and cos φ2 are represented as (7/sqrt(338)), (7/sqrt(50)), (17/sqrt(338)) and (1/sqrt(50)), and the moire pitch Pm is obtained as sqrt(130/128) times the pitch Pe of the first and second dot centers 811, 812 by substituting the above values for Eq. 5. In this case, the first moire direction is a direction which is counterclockwise tilted by an angle (about 52.1 degrees) of the arctangent of (9/7) relatively to the reference direction as described in the lowest part of Table 1 in the Document 3.

Then, the plurality of third dot centers 813 are arranged both in the first tilt direction tilted relatively to the first moire direction by the tilt angle which is the arctangent of ((N*Pm)/(M*Pm)) (where M, N are positive integers) and the second tilt direction orthogonal to the first tilt direction, at the third pitch which is Ia times or (1/Ia) times the square root of $((M*Pm)^2+(N*Pm)^2)$ (where Ia is a positive integer) in the matrix area 803 of the third color component, and it is therefore possible to suppress the second-order moire by interference between the first-order moire, which is caused between the halftone image of the first color component and the halftone image of the second color component, and the halftone image of the third color component.

When M and N are both 1, the first tilt direction is a direction which is counterclockwise tilted relatively to the first moire direction by 45 degrees and the second tilt direction is a direction which is clockwise tilted relatively to the first moire direction by 45 degrees. Specifically, if φm is a counterclockwise angle of the first moire direction relative to the reference direction, the first and second tilt directions are directions which are tilted relatively to the reference direction by (φm+45 degrees) and (φm−45 degrees). As described above, since tan( (b m) is (9/7), tan(φm+45 degrees) and tan(φm−45 degrees) are (−8) and (1/8), respectively. Therefore, angles of the first and second tilt directions relative to the reference direction can be represented as the arctangent of (−8) (about 97.1 degrees) and the arctangent of (1/8) (about 7.1 degrees).

In a case where an angle formed between an arrangement direction of halftone dots in a halftone image and the scan direction is set to 0 or 45 degrees in the printer 1, if there is an outlet 231 which ejects a larger amount of ink than the other outlets 231, large dots (elements of halftone dots) are written at the same position in the width direction, in halftone dots arranged in the scan direction (also in a case where the arrangement direction is tilted relatively to the scan direction by 45 degrees, halftone dots seem to be arranged in the scan direction) by influence of the outlet 231, to thereby cause banding unevenness (longitudinal streaks).

On the other hand, in the above process, since the angle formed between the arrangement direction of halftone dots and the scan direction can be set to angles other than 0 and 45 degrees in each of the halftone images of the plurality of color components, it is possible to suppress appearance of the second-order moire and the longitudinal streaks in a printed image in the printer 1 even if there is an outlet 231 which ejects a larger amount of ink than the other outlets 231.

Next, discussion will be made on a case of generating threshold matrixes for generation of halftone images of the fourth to sixth color components, in addition to the threshold matrixes of the above first to third color components. In the printer 1 using the threshold matrixes of six colors, inks of special colors such as orange and green can be ejected in addition to yellow, cyan, magenta and black which are normally used.

Figure 18:
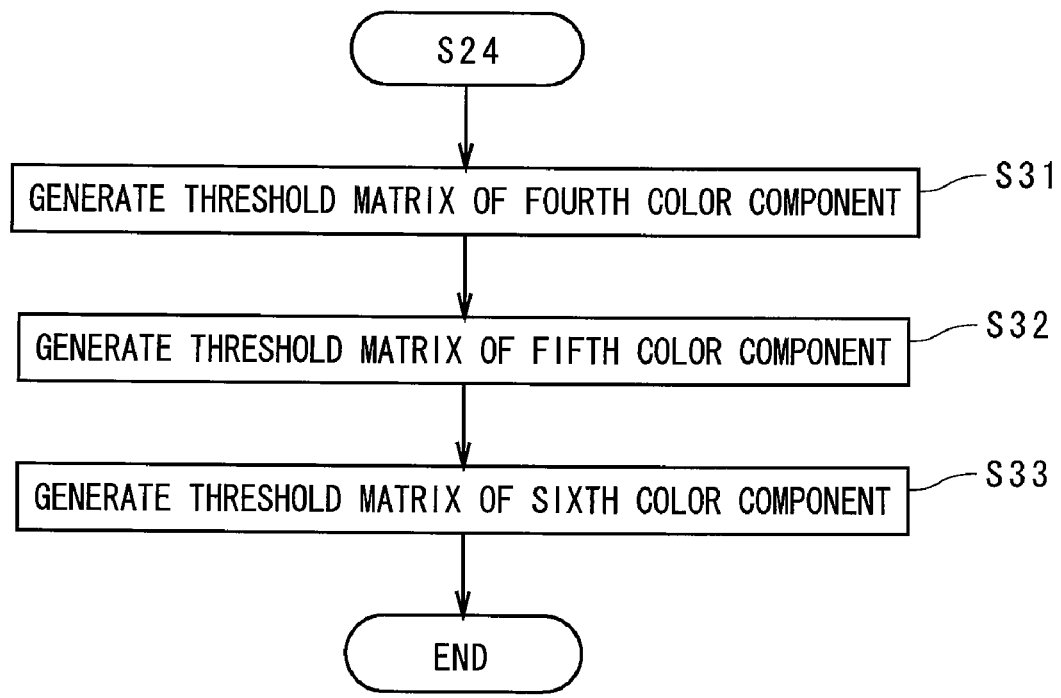
FIGS. 18 and 19 are flowcharts each showing a part of a process flow for generating threshold matrixes.

FIG. 18 is a flowchart showing a part of a process flow for generating threshold matrixes and shows processes which are performed after Step S24 of FIG. 9. After generation of the threshold matrixes of the first to third color components, a matrix area of the fourth color component which is an area where a threshold matrix of the fourth color component is stored and defined in the row and column directions similarly to the matrix area of the first color component, is set in the matrix generation part 5. A plurality of fourth dot centers are arranged in the first and second moire directions at the moire pitch Pm in the matrix area of the fourth color component. The first and second moire directions and the moire pitch Pm are already acquired in the process of Step S23.

After arrangement of the plurality of fourth dot centers, similarly to the generation process of the threshold matrix of the first color component, a threshold value is set at each of positions in the matrix area so that a halftone dot grows from a position in the halftone image corresponding to each fourth dot center (the position is also referred to as "fourth dot center") in accordance with increase of gray level of the fourth color component of the original image, to thereby generate a threshold matrix of the fourth color component (Step S31).

After generation of the threshold matrix of the fourth color component, set is a matrix area of the fifth color component which is an area where a threshold matrix of the fifth color component is stored and defined in the row and column directions. A plurality of fifth dot centers are arranged in both the third tilt direction and the fourth tilt direction orthogonal to the third tilt direction at a pitch in the matrix area, the third tilt direction being tilted relatively to one of two directions (i.e., the x1 direction and the y1 direction) in which the plurality of first dot centers 811 of the first color component are arranged at a pitch Pe, by a tilt angle which is the arctangent of $((K*Pe)/(J*Pe))$ (where J and K are positive integers), the pitch of the plurality of fifth dot centers being Ib times or (1/Ib) times the square root of $((J*Pe)^2+(K*Pe)^2)$ (where Ib is a positive integer).

After arrangement of the plurality of fifth dot centers, a threshold value is set at each of positions in the matrix area so that a halftone dot grows from a position in the halftone image corresponding to each fifth dot center (the position is also referred to as "fifth dot center") in accordance with increase of gray level of the fifth color component of the original image, to thereby generate a threshold matrix of the fifth color component (Step S32).

In view of overlaying of the plurality of linear elements L2 and the plurality of virtual lines L3 (each of which has a constant width similarly to the linear element L2) in FIG. 1, since it is considered that periodic repetition of dark and light regions appears in a direction perpendicular to the linear elements L1 at the pitch of the plurality of linear elements L1, the arrangement of the plurality of first dot centers 811 of the first color component can be considered to indicate candidate positions of moire elements included in the first-order moire appearing by overlaying the halftone image of the second color component and a halftone image of the fourth color component (i.e., a halftone image corresponding to a pattern of the plurality of virtual lines L3 each having the constant width). Therefore, the above process of arranging the plurality of fifth dot centers is equivalent to arranging the plurality of fifth dot centers in both the third tilt direction and the fourth tilt direction orthogonal to the third tilt direction at a pitch in a halftone image, the third tilt direction being tilted relatively to one of two arrangement directions in which the candidate positions of the moire elements included in the first-order moire are arranged at a pitch Pe, by a tilt angle which is the arctangent of $((K*Pe)/(J*Pe))$ (where J and K are positive integers), the pitch of the plurality of fifth dot centers being Ib times or (1/Ib) times the square root of $((J*Pe)^2+(K*Pe)^2)$ (where Ib is a positive integer) (the same is applied in arrangement of the sixth dot centers of the sixth color component, which is discussed later).

After generation of the threshold matrix of the fifth color component, set is a matrix area of the sixth color component which is an area where a threshold matrix of the sixth color component is stored and defined in the row and column directions. A plurality of sixth dot centers are arranged in both the fifth tilt direction and the sixth tilt direction orthogonal to the fifth tilt direction at a pitch in the matrix area, the fifth tilt direction being tilted relatively to one of two directions (i.e., the x2 direction and the y2 direction) in which the plurality of second dot centers 812 of the second color component are arranged at a pitch Pe, by a tilt angle which is the arctangent of $((F*Pe)/(H*Pe))$ (where F and H are positive integers), the pitch of the plurality of sixth dot centers being Ic times or (1/Ic) times the square root of $((F*Pe)^2+(H*Pe)^2)$ (where Ic is a positive integer).

After arrangement of the plurality of sixth dot centers, a threshold value is set at each of positions in the matrix area so that a halftone dot grows from a position in the halftone image corresponding to each sixth dot center (the position is also referred to as "sixth dot center") in accordance with increase of gray level of the sixth color component of the original image, to thereby generate a threshold matrix of the sixth color component (Step S33).

In a halftone image generated with the threshold matrix of the fourth color component which is generated by the above process, since the pitch of the fourth dot centers is made equal to the moire pitch with respect to each of the first and second moire directions, it is possible to prevent appearance of unexpected strong moire (i.e., suppress moire) in overlaying the halftone images of the first to fourth color components.

With respect to each of the first and second moire directions, frequency components of the halftone image generated with the threshold matrix of the fifth color component approximates to those of the halftone image of the first color component, and with respect to each of the first and second moire directions, frequency components of the halftone image generated with the threshold matrix of the sixth color component approximates to those of the halftone image of the second color component. Thus, it is possible to prevent appearance of unexpected strong moire in overlaying the halftone images of the fifth and/or sixth color components on the halftone images of the first to third color components. The pitch of the firth dot centers in the third and fourth tilt directions and the pitch of the sixth dot centers in the fifth and sixth tilt directions are preferably made equal to or smaller than sqrt(10) times (equal to or larger than ¼ times) the pitch of the first and second dot centers 811, 812, and more preferably, made equal to or smaller than sqrt(5) times the pitch of the first and second dot centers 811, 812.

When orange and green are used in addition to yellow, cyan, magenta and black, it is considered that the FM (Frequency Modulated) screening where gray levels are represented by changing the number of halftone dots (typically, one dot (or pixel)) of certain size, which are irregularly arranged, is used only to orange and green for preventing appearance of strong moire caused by overlaying halftone images of orange and green on the halftone images of cyan, magenta and black. However, in this case, there is a case where graininess derived from the halftone images of orange and green occurs in a multicolor halftone image.

On the other hand, in the printer 1, since halftoning of the original image is performed with the threshold matrixes of the first to sixth color components generated in the above process, it is possible to prevent appearance of unexpected overlaying moire in overlaying the halftone images of the first to sixth color components and to represent the halftone images of all the color components by the AM screening where graininess does not occur.

In the processes of Steps S24, S32, S33, if the pitches of the third, fifth, and sixth dot centers are Ia times the square root of $((M*Pm)^2+(N*Pm)^2)$, Ib times the square root of $((J*Pe)^2+(K*Pe)^2)$, and Ic times the square root of $((F*Pe)^2+(H*Pe)^2)$, respectively, the spatial frequencies of the halftone images generated with the first, second, fourth threshold matrixes are normally higher than those of the halftone images generated with the third, fifth, and sixth threshold matrixes (i.e., the halftone images generated with the first, second, fourth threshold matrixes are represented by high-frequency screen). If the pitches of the third, fifth, and sixth dot centers are 1/Ia times the square root of $((M*Pm)^2+(N*Pm)^2)$, 1/Ib times the square root of $((J*Pe)^2+(K*Pe)^2)$, and 1/Ic times the square root of $((F*Pe)^2+(H*Pe)^2)$, respectively, the spatial frequencies of the halftone images generated with the third, fifth, and sixth threshold matrixes are higher than those of the halftone images generated with the first, second, fourth threshold matrixes.

Though the threshold matrixes of the first to sixth color components are generated in the above process, there may be a case where the threshold matrix generated in the process of Step S32 or the threshold matrix generated in the process of Step S33 may be used as the threshold matrix of the fourth color component only in generating the halftone images of the four color components. The threshold matrix of the fourth color component may be generated by changing values of M, N in "(N*Pm)/(M*Pm)" and "$(M*Pm)^2+(N*Pm)^2$" in generating the threshold matrix of the third color component.

Figure 19:
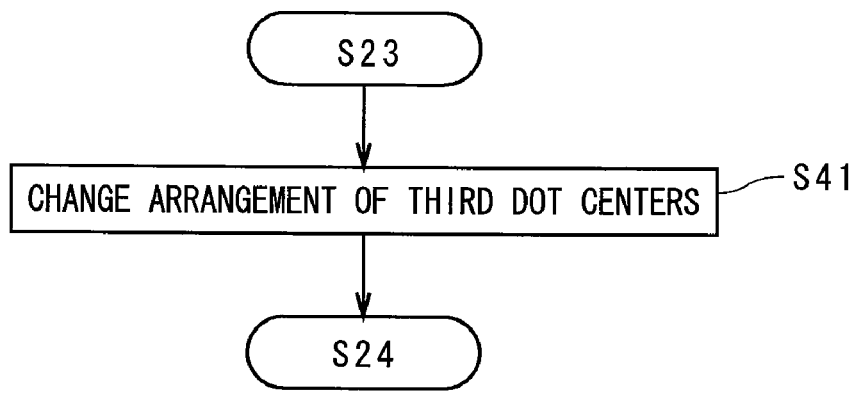

Next, discussion will be made on the second preferred embodiment of the present invention. FIG. 19 is a flowchart showing a part of a process flow for generating threshold matrixes in accordance with the second preferred embodiment and shows a process which is performed between Step S23 and Step S24 of FIG. 9.

Figure 20:
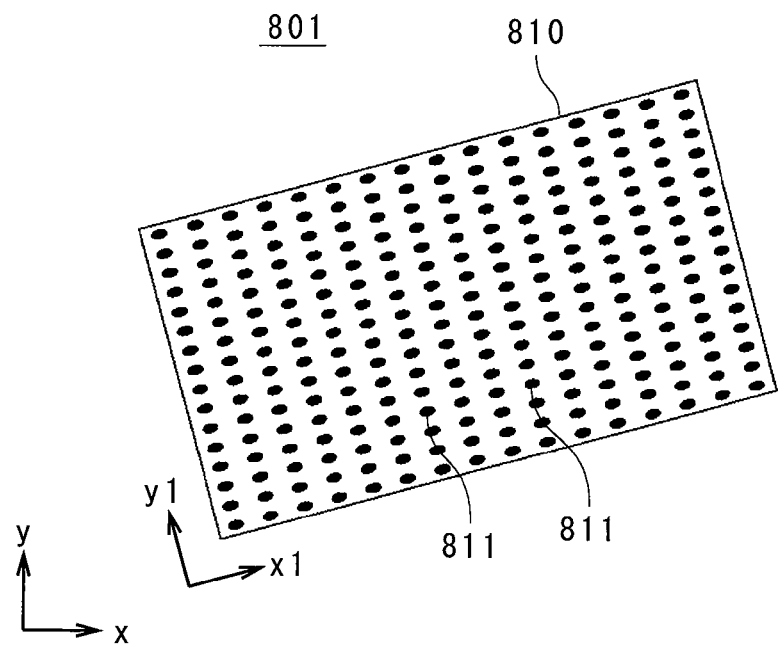
FIG. 20 is a view showing a matrix area of the first color component.

In Step S21 of a threshold matrix generation process according to the second preferred embodiment, the pitch in the y1 direction is made to a predetermined value multiple of the pitch in the x1 direction when the plurality of first dot centers 811 are arranged in the x1 direction and the y1 direction orthogonal to the x1 direction in the first matrix area 801. In the present preferred embodiment, as shown in FIG. 20, the pitch in the y1 direction is 0.5 times the pitch in the x1 direction and the angles of the x1 direction and the y1 direction relative to the reference direction (the x direction) are made equal to those in the case of FIG. 10. Then, a threshold value is set at each of positions in the matrix area 801 so that a halftone dot grows from each first dot center in the halftone image in accordance with increase of gray level of the first color component of the original image, to generate a threshold matrix of the first color component (Step S21). At this time, in consideration with the ratio between the pitch of the first dot centers 811 in the x1 direction and that in the y1 direction, a threshold value of each position in the matrix area 801 is determined so that a halftone dot which is long in the x1 direction grows in the halftone image. In FIG. 20, the width of the first dot center 811 in the y1 direction is narrower than that in the x1 direction, that is, the first dot center 811 is shown by an ellipse, but actually, the first dot center 811 is a point (the same is applied in FIGS. 21 and 22 discussed later).

Figure 21:
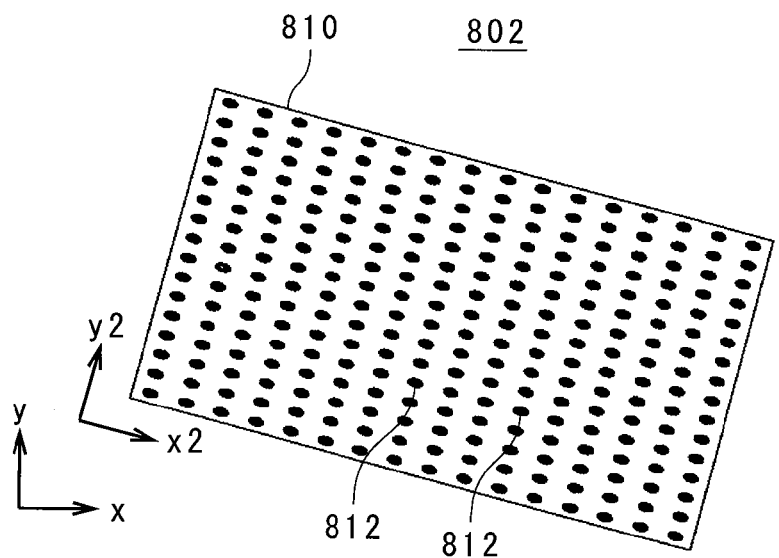
FIG. 21 is a view showing a matrix area of the second color component.

In the process of Step S22, when the plurality of second dot centers 812 are arranged in the x2 direction and the y2 direction orthogonal to the x2 direction in the second matrix area 802, the y2 direction out of the x2 direction and the y2 direction is specified where an angle formed between the y2 direction and the y1 direction is equal to or smaller than an angle formed between the y2 direction and the x1 direction. As shown in FIG. 21, the plurality of second dot centers 812 are arranged in a state where the pitch in the y2 direction is made to the predetermined value times (i.e., 0.5 times) the pitch in the x2 direction. In the present preferred embodiment, the angles of the x2 direction and the y2 direction relative to the reference direction (the x direction) are the same as those in the case of FIG. 11, and the pitch in the x2 direction and the pitch in the y2 direction are equal to the pitch in the x1 direction and the pitch in the y1 direction in the matrix area of the first color component, respectively. A threshold value is set at each of positions in the matrix area 802 so that a halftone dot grows from each second dot center in the halftone image in accordance with increase of gray level of the second color component of the original image, to generate a threshold matrix of the second color component (Step S22).

In the process of Step S23, on the assumption that the pitch of the first dot centers 811 in the y1 direction is one time that in the x1 direction (i.e., the pitch in the y1 direction is same as the pitch in the x1 direction) and the pitch of the second dot centers 812 in the y2 direction is one time that in the x2 direction, the first and second moire directions and the moire pitch Pm are acquired with using the above Eqs. 3 and 4, and in the matrix area of the third color component, the plurality of third dot centers are arranged in both the first tilt direction tilted relatively to the first moire direction by the tilt angle which is the arctangent of ((N*Pm)/(M*Pm)) (where M, N are positive integers) and the second tilt direction orthogonal to the first tilt direction, at a pitch which is Ia times or (1/Ia) times the square root of ((M*Pm)$^2$+(N*Pm)$^2$) (where Ia is a positive integer). In this process, M and N are considered as both 1 similarly to the case of FIG. 12, and the arrangement directions (the first and second tilt directions) of the third dot centers 813 and the pitch of the third dot centers 813 are obtained.

After arrangement of the plurality of third dot centers 813, an arrangement of the plurality of third dot centers 813 is changed so that a pitch of one direction out of the first tilt direction and the second tilt direction is the predetermined value multiple (0.5 times in the preferred embodiment) of the pitch of the other direction (i.e., the pitch obtained in above Step S23) where an angle formed between the one direction and the y1 direction of the first dot centers 811 is equal to or smaller than that formed between the one direction and the x1 direction (Step S41).

Figure 22:
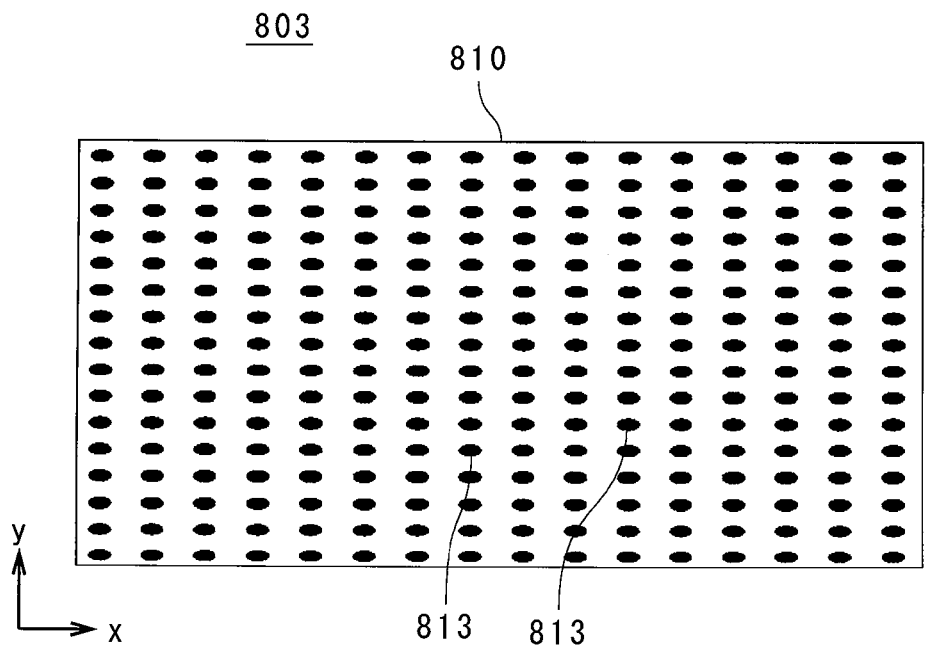
FIG. 22 is a view showing a matrix area of the third color component.

FIG. 22 is a view showing an arrangement of the third dot centers 813. After the arrangement of the plurality of third dot centers 813 is changed, a threshold value is set at each of positions in the matrix area 803 so that a halftone dot grows from each third dot center in the halftone image in accordance with increase of gray level of the third color component of the original image, to generate a threshold matrix of the third color component (Step S24) and to complete the process of generating the threshold matrixes.

In FIG. 1, repetition of dark and light regions appears in the direction perpendicular to the virtual lines L3 at the pitch of the virtual lines L3 by overlaying the plurality of linear elements L1 and the plurality of linear elements L2. If a pitch of one plurality of linear elements (i.e., the pitch of linear elements L1 or linear elements L2) is changed to 0.5-fold and the one plurality of linear elements after changing are overlaid on the other plurality of linear elements, the direction where repetition of dark and light regions appears becomes the direction perpendicular to the virtual lines L3 similarly to the case before changing the pitch of the one plurality of linear elements, however, the cycle of repetition of dark and light regions (the pitch of lines corresponding to the virtual lines L3) becomes 0.5 times that (the pitch of the virtual lines L3) before changing the pitch of the one plurality of linear elements.

As discussed above, in the combination of each arrangement direction of the first dot centers 811 and an arrangement direction of the second dot centers 812 corresponding to the arrangement direction of the first dot centers 811 (i.e., the combination of each arrangement direction of the first dot centers 811 and a direction out of the two arrangement directions of the second dot centers 812, the direction forming a greater angle with the arrangement direction of the first dot centers 811, and the combination is each of the combination of the y1 direction and the x2 direction and that of the y2 direction and the x1 direction), the pitch of one arrangement direction is 0.5 times the pitch of the other arrangement direction in the processes of Steps S21, S22. Thus, the plurality of candidate positions corresponding to the first-order moire appearing by overlaying the halftone image generated with the threshold matrix of the first color component and the halftone image generated with the threshold matrix of the second color component, are arranged in the first and second moire directions at a pitch which is 0.5 times the moire pitch Pm which is acquired on the assumption that the pitch of the first dot centers 811 in the y1 direction is one time that in the x1 direction and the pitch of the second dot centers 812 in the y2 direction is one time that in the x2 direction.

Figure 23:
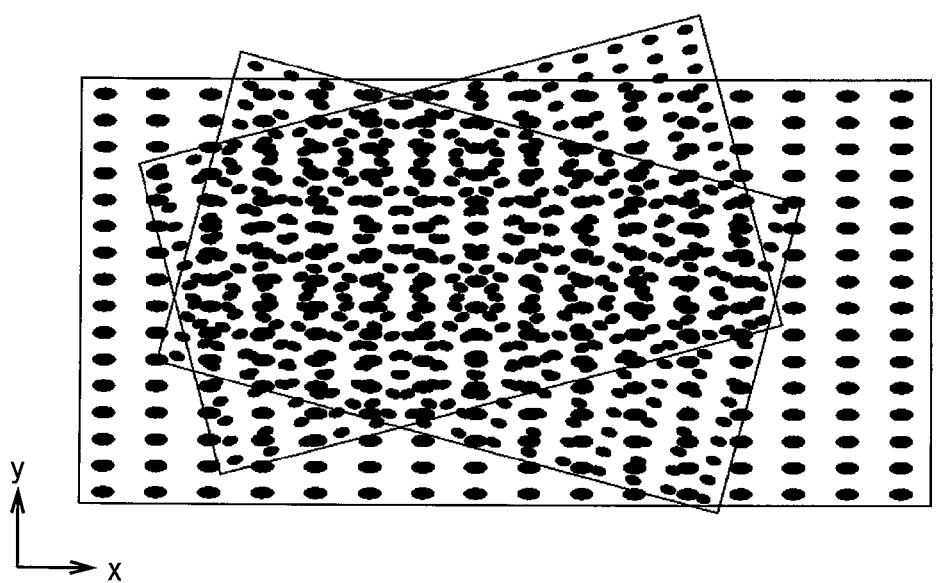
FIG. 23 is a view showing halftone images of the three color components overlaid one another.

As a result, in a multicolor halftone image where the halftone images generated with the threshold matrixes of the first to third color components are overlaid, frequency components of the first-order moire appearing by overlaying the first and second halftone images are made to be approximate to those of the halftone image of the third color component with respect to each of the first and second moire directions, and it is possible to prevent appearance of a strong second-order moire which is unexpected, as shown in FIG. 23. In the printer 1, even if a recording resolution in the main scan direction corresponding to the y direction is lower than that in the width direction, it is possible to suppress extension of spacing between adjacent halftone dots in a direction where the recording resolution is low in a printed image.

As discussed above, in the threshold matrix generation process according to the second preferred embodiment, the process shown in FIG. 19 is added between Step S23 and Step S24 of FIG. 9 and the contents of the processes of Steps S21, S22 are changed. If the threshold matrix generation process according to the second preferred embodiment is regarded as a generalized process, the threshold matrix generation process according to the first preferred embodiment is a process where the above predetermined value multiple is set to one time in the processes of Steps S21, S22 (the pitch in the y1 direction is one time that in the x1 direction and the pitch in the y2 direction is one time that in the x2 direction) and the process of FIG. 19 is omitted, and in this case, it is possible to generate the threshold matrixes easily.

Next discussion will be made on the third preferred embodiment of the present invention. Though the halftone image is generated with using the threshold matrixes at high speed in the printer 1 according to the first and second preferred embodiments, halftone images are generated without using threshold matrixes (by the irrational tangent method) in the printer 1 of FIG. 1 according to the present preferred embodiment.

Figure 24:
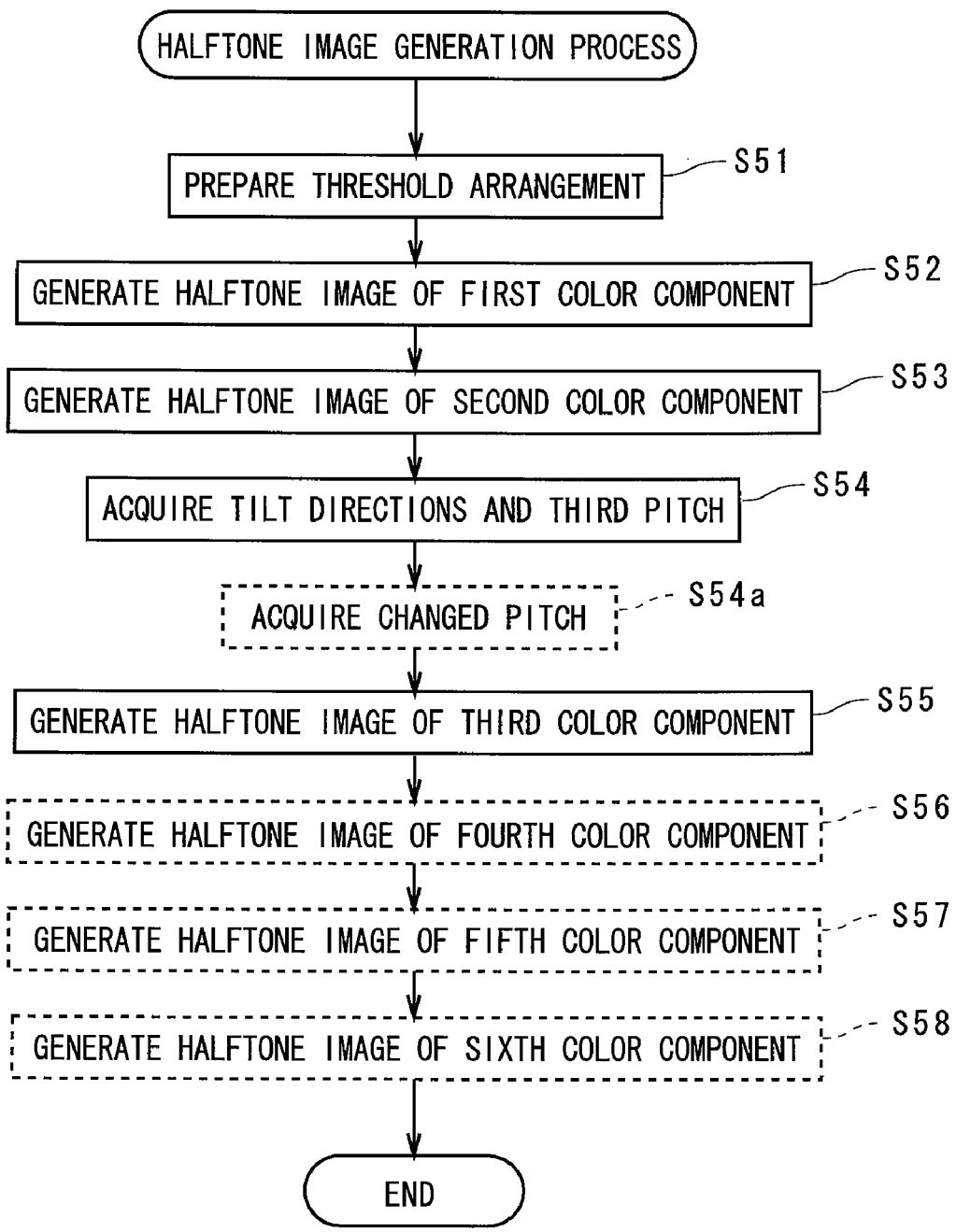
FIG. 24 is a flowchart showing a process flow for generating halftone images.

FIG. 24 is a flowchart showing a process flow for generating halftone images according to the third preferred embodiment. Steps S54a, S56, S57, S58 shown by broken line rectangles in FIG. 24 are the contents of processes which are performed in an operation example discussed later. In the following description, with respect to each of halftone images of the first and second color components, desired angles of arrangement directions of halftone dots relative to the reference direction and a pitch of halftone dots (where a pitch of dot centers of the first color component is equal to that of the second color component) are, for example, inputted by an operator in advance and set in the main body control part 4.

In the main body control part 4, a threshold arrangement corresponding to one halftone dot where threshold values are arranged in a row direction and a column direction, is stored and prepared (Step S51). If dot centers are arranged in the row and column directions in a matrix area to generate a threshold matrix, the threshold arrangement can be regarded as a group of elements in the matrix area, the nearest dot centers of respective elements included in the group of elements being same.

After preparation of the threshold arrangement, coordinate values in a coordinate system of the threshold arrangement, the coordinate values corresponding to respective pixels in an original image, are sequentially obtained with predetermined angles and pitch of the first color component in the main body control part 4 so that halftone dots are arranged at the angles and the pitch in a halftone image of the first color component, and values of the pixels are compared with threshold values in the coordinate values to generate the halftone image of the first color component (Step S52).

Subsequently, similarly to generation of the halftone image of the first color component, coordinate values in the coordinate system of the threshold arrangement, the coordinate values corresponding to respective pixels in the original image, are sequentially obtained with predetermined angles and pitch of the second color component so that halftone dots are arranged at the angles and the pitch in a halftone image of the second color component, and values of the pixels are compared with threshold values in the coordinate values to generate the halftone image of the second color component (Step S53).

After generation of the halftone images of the first and second color components, the first and second moire directions of a plurality of candidate positions included in the first-order moire appearing as periodic repetition of dark and light regions by overlaying the halftone image of the first color component and the halftone image of the second color component and a moire pitch Pm are obtained with Eqs. 3 and 4. Then, acquired are the first tilt direction tilted relatively to the first moire direction by a tilt angle which is the arctangent of $((N*Pm)/(M*Pm))$ (where M, N are positive integers) and the second tilt direction orthogonal to the first tilt direction and the third pitch which is Ia times or (1/Ia) times the square root of $((M*Pm)^2+(N*Pm)^2)$ (where Ia is a positive integer) (Step S54).

Coordinate values in the coordinate system of the threshold arrangement, the coordinate values corresponding to respective pixels in the original image, are sequentially obtained with angles of the first and second tilt directions relative to the reference direction and the third pitch so that halftone dots are arranged in the first and second tilt directions at the third pitch in a halftone image of the third color component, and values of the pixels are compared with threshold values in the coordinate values to generate the halftone image of the third color component (Step S55) and to complete generation process of a multicolor halftone image.

Actually, when the angles of the arrangement directions of halftone dots and the pitch of halftone dots are set with regard to each of the halftone images of the first and second color components, values of N, M, and Ia in the process of Step S54 are inputted by the operator. In the printer 1, generation of the halftone image of the first color component in Step S52, generation of the halftone image of the second color component in Step S53 and generation of the halftone image of the third color component in Step S55, and ejection control of ink (a printing operation) based on halftone image data of the first to third color components are performed in parallel.

As discussed above, in the printer 1 according to the preferred embodiment, arrangement directions and a pitch of halftone dots in the halftone image of the third color component are obtained on the basis of an arrangement of candidate positions of moire elements included in first-order moire appearing by overlaying the halftone images of the first and second color components, and frequency components of the first-order moire can be approximate to those of the halftone image of the third color component with respect to each of the first and second moire directions which are the arrangement directions of the candidate positions of the moire elements. As a result, it is possible to widely determine the pitches and arrangement directions of halftone dots in the halftone images and to suppress the second-order moire by interference between the first-order moire, which is caused between the halftone image of the first color component and the halftone image of the second color component, and the halftone image of the third color component.

Next, discussion will be made on an operation example for generating halftone images (halftone images which are the same as those in FIG. 23) where a pitch of one arrangement direction is made to a predetermined value multiple of that of the other arrangement direction in each color component. The process of Step S54a in FIG. 24 is performed in the operation example.

After preparation of the threshold arrangement (Step S51), a halftone image of the first color component where a halftone dot grows from each of a plurality of first dot centers arranged in the first direction and the second direction orthogonal to the first direction, in accordance with increase of gray level of the first color component of the original image, is generated, a pitch of the plurality of first dot centers in the first direction being a predetermined value multiple of that in the second direction (Step S52). Further, a halftone image of the second color component where a halftone dot grows from each of a plurality of second dot centers arranged in the third direction and the fourth direction orthogonal to the third direction, in accordance with increase of gray level of the second color component of the original image, is generated, an angle formed between the third direction and the first direction being equal to or smaller than that formed between the third direction and the second direction, a pitch of the plurality of second dot centers in the third direction being the above predetermined value multiple of that in the fourth direction (Step S53).

Subsequently, the first and second moire directions of a plurality of candidate positions corresponding to first-order moire appearing by overlaying the halftone images of the first and second color components and a moire pitch Pm are obtained on the assumption that the above predetermined value multiple is one time. The first and second tilt directions and the third pitch are acquired similarly to the above process (Step S54), and a pitch which is the above predetermined value multiple of the third pitch is obtained (hereinafter, the pitch is referred to as "change pitch") (Step S54a).

After the changed pitch is obtained, generated is a halftone image of the third color component where a halftone dot grows from each of a plurality of third dot centers in accordance with increase of gray level of the third color component of the original image, the plurality of third dot centers being arranged in the first tilt direction and the second tilt direction, a pitch of the plurality of third dot centers in one direction out of the first tilt direction and the second tilt direction being the changed pitch where an angle formed between the one direction and the first direction in the first halftone image is equal to or smaller than that formed between the one direction and the second direction, a pitch of the plurality of third dot centers in the other direction being the third pitch (Step S55). It is possible to suppress second-order moire also in a multicolor halftone image where the first to third halftone images generated in the above process are overlaid.

If the above halftone image generation process including the process of acquiring the changed pitch is regarded as a generalized process, the above process of generating the first to third halftone images without acquiring the changed pitch (i.e., the halftone image generation process which is first explained in the third preferred embodiment) is a process where the above predetermined value multiple is set to one time in the processes of Steps S52, S53 (i.e., the pitch in the first direction is one time that in the second direction and the pitch in the third direction is one time that in the fourth direction), the process of Step S54a is omitted and further, the third pitch acquired in the process of Step S54 is used instead of the changed pitch in the process of Step S55. In this process, it is possible to generate a multicolor halftone image easily.

In the printer 1, halftone images of the fourth to sixth color components may be generated in addition to the halftone images of the first to third color components. Specifically, after generation of the first to third halftone images (or almost in parallel with generation of the first to third halftone images), a halftone image of the fourth color component, where a halftone dot grows from each of a plurality of fourth dot centers arranged in the first and second moire directions at the moire pitch Pm in accordance with increase of gray level of the fourth color component of the original image, is generated (Step S56). The first and second moire directions and the moire pitch Pm are obtained in the process of Step S54.

Subsequently, a halftone image of the fifth color component where a halftone dot grows from each of a plurality of fifth dot centers in accordance with increase of gray level of the fifth color component of the original image, is generated, the plurality of fifth dot centers being arranged in both the third tilt direction and the fourth tilt direction orthogonal to the third tilt direction at a pitch in the halftone image, the third tilt direction being tilted relatively to one of two directions in which the plurality of first dot centers of the first color component are arranged at a pitch Pe, by a tilt angle which is the arctangent of $((K*Pe)/(J*Pe))$ (where J and K are positive integers), the pitch of the plurality of fifth dot centers being Ib times or (1/Ib) times the square root of $((J*Pe)^2+(K*Pe)^2)$ (where Ib is a positive integer) (Step S57).

After generation of the halftone image of the fifth color component, a halftone image of the sixth color component where a halftone dot grows from each of a plurality of sixth dot centers in accordance with increase of gray level of the sixth color component of the original image, is generated, the plurality of sixth dot centers being arranged in both the fifth tilt direction and the sixth tilt direction orthogonal to the fifth tilt direction at a pitch in the halftone image, the fifth tilt direction being tilted relatively to one of two directions in which the plurality of second dot centers of the second color component are arranged at a pitch Pe, by a tilt angle which is the arctangent of $((F*Pe)/(H*Pe))$ (where F and H are positive integers), the pitch of the plurality of sixth dot centers being Ic times or (1/Ic) times the square root of $((F*Pe)^2+(H*Pe)^2)$ (where Ic is a positive integer) (Step S58).

By the above processes, it is possible to prevent appearance of unexpected strong moire in overlaying the halftone images of the first to sixth color components, similarly to the case of overlaying the halftone images of the first to sixth color components generated with the threshold matrixes of the first to sixth color components in the first preferred embodiment.

Though the preferred embodiments of the present invention have been discussed above, the present invention is not limited to the above-discussed preferred embodiments, but allows various variations.

Although the pitch of the first dot centers of the first color component is equal to that of the second dot centers of the second color component in the above first and third preferred embodiments, the pitch of the first dot centers may be different from that of the second dot centers. In this case, the first and second moire directions and the moire pitch are obtained with Eqs. 1 and 2. Similarly, in the second preferred embodiment, the pitches of the first and second dot centers in obtaining the moire pitch (i.e., the pitches on the assumption that the predetermined value multiple is one time) are different from each other.

In the example where the pitch of the third dot centers 813 is sqrt(2) times the moire pitch in the first preferred embodiment, the third color component is black for suppressing print unevenness in a printed image, but a color component where a pitch of dot centers becomes maximum may be black in another example. That is to say, in a case where one of the first to third color components (the fourth to six color components may be included) is black, a pitch of dot centers in a halftone image of black is made larger than that of each of the other color components and it is therefore possible to suppress print unevenness in a printed image, such as longitudinal streaks caused by the image of black (similarly in the case where the pitches in the two arrangement directions of the halftone image of each color component are equal in the third preferred embodiment).

In the above first to third preferred embodiments, the main body control part 4 in the printer 1 functions as a halftone image generating apparatus for generating halftone images, however, the function of the halftone image generating apparatus is not necessarily provided together with the printer 1 as a unit. Data of a halftone image may be used for another image recording apparatus for recording a halftone image, which is generated by halftoning the original image, on an object, such as an electrophotographic plateless printer or a plate-making apparatus for CTP (Computer To Plate) and an image setter, as well as the inkjet printer 1, or may be used in the other applications such as displaying of an image on a display, as well as image recording.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2008-62837 filed in the Japan Patent Office on Mar. 12, 2008, the entire disclosure of which is incorporated herein by reference.

What is claimed is:

1. A threshold matrix generation method of generating threshold matrixes which are compared with a multicolor original image in generating halftone images representing said original image, comprising the steps of:
   a) setting threshold values in a matrix area of a first color component so that a halftone dot grows from each of a plurality of first dot centers arranged in a halftone image in accordance with increase of gray level of said first color component of an original image, to generate a threshold matrix of said first color component, said plurality of first dot centers being arranged in a first direction and a second direction orthogonal to said first direction in said halftone image, a pitch of said plurality of first dot centers in said first direction being a predetermined value multiple of a pitch of said plurality of first dot centers in said second direction;
   b) setting threshold values in a matrix area of a second color component so that a halftone dot grows from each of a plurality of second dot centers arranged in a halftone image in accordance with increase of gray level of said second color component of said original image, to generate a threshold matrix of said second color component, said plurality of second dot centers being arranged in a third direction and a fourth direction orthogonal to said third direction in said halftone image, an angle formed between said third direction and said first direction being equal to or smaller than that formed between said third direction and said second direction, a pitch of said plurality of second dot centers in said third direction being said predetermined value multiple of a pitch of said plurality of second dot centers in said fourth direction;

c) arranging a plurality of third dot centers in a matrix area of a third color component, wherein each of a plurality of moire elements which are repeat elements of first-order moire appearing as periodic repetition of dark and light regions by overlaying a halftone image of said first color component and a halftone image of said second color component which are generated on the assumption that said predetermined value multiple is one time, is positioned at one of a plurality of candidate positions arranged at a moire pitch Pm in both a first moire direction and a second moire direction orthogonal to said first moire direction, and said plurality of third dot centers are arranged in both a first tilt direction tilted relatively to said first moire direction by a tilt angle which is the arctangent of $((N*Pm)/(M*Pm))$ (where M, N are positive integers) and a second tilt direction orthogonal to said first tilt direction, at a pitch which is Ia times or (1/Ia) times the square root of $((M*Pm)^2+(N*Pm)^2)$ (where Ia is a positive integer);

d) changing an arrangement of said plurality of third dot centers where a pitch of one direction out of said first tilt direction and said second tilt direction is said predetermined value multiple of a pitch of the other direction, an angle formed between said one direction and said first direction being equal to or smaller than that formed between said one direction and said second direction; and e) setting threshold values in said matrix area of said third color component so that a halftone dot grows from each of said plurality of third dot centers arranged in a halftone image in accordance with increase of gray level of said third color component of said original image, to generate a threshold matrix of said third color component.

2. A threshold matrix generation method of generating threshold matrixes which are compared with a multicolor original image in generating halftone images representing said original image, comprising the steps of:

a) setting threshold values in a matrix area of a first color component so that a halftone dot grows from each of a plurality of first dot centers arranged in a halftone image in accordance with increase of gray level of said first color component of an original image, to generate a threshold matrix of said first color component, said plurality of first dot centers being arranged in a first direction and a second direction orthogonal to said first direction in said halftone image, a pitch of said plurality of first dot centers in said first direction being equal to a pitch of said plurality of first dot centers in said second direction;

b) setting threshold values in a matrix area of a second color component so that a halftone dot grows from each of a plurality of second dot centers arranged in a halftone image in accordance with increase of gray level of said second color component of said original image, to generate a threshold matrix of said second color component, said plurality of second dot centers being arranged in a third direction and a fourth direction orthogonal to said third direction in said halftone image, an angle formed between said third direction and said first direction being equal to or smaller than that formed between said third direction and said second direction, a pitch of said plurality of second dot centers in said third direction being equal to a pitch of said plurality of second dot centers in said fourth direction;

c) arranging a plurality of third dot centers in a matrix area of a third color component, wherein each of a plurality of moire elements which are repeat elements of first-order moire appearing as periodic repetition of dark and light regions by overlaying a halftone image of said first color component and a halftone image of said second color component, is positioned at one of a plurality of candidate positions arranged at a moire pitch Pm in both a first moire direction and a second moire direction orthogonal to said first moire direction, and said plurality of third dot centers are arranged in both a first tilt direction tilted relatively to said first moire direction by a tilt angle which is the arctangent of $((N*Pm)/(M*Pm))$ (where M, N are positive integers) and a second tilt direction orthogonal to said first tilt direction, at a pitch which is Ia times or (1/Ia) times the square root of $((M*Pm)^2+(N*Pm)^2)$ (where Ia is a positive integer); and d) setting threshold values in said matrix area of said third color component so that a halftone dot grows from each of said plurality of third dot centers arranged in a halftone image in accordance with increase of gray level of said third color component of said original image, to generate a threshold matrix of said third color component.

3. The threshold matrix generation method according to claim 2, wherein a pitch Pe of said plurality of first dot centers is equal to that of said plurality of second dot centers and an angle $\theta$ is formed between said first direction and said fourth direction, and said moire pitch is $(Pe/(2*\sin(\theta/2)))$ and one direction out of said first moire direction and said second moire direction is a direction which divides an angle formed between said first direction and said fourth direction into two equally.

4. The threshold matrix generation method according to claim 2, wherein one of said first color component, said second color component, and said third color component is black, and a pitch of dot centers included in a halftone image of said black is larger than that in a halftone image of each of the other color components.

5. The threshold matrix generation method according to claim 2, further comprising the step of setting threshold values in a matrix area of a fourth color component so that a halftone dot grows from each of a plurality of fourth dot centers arranged in a halftone image in accordance with increase of gray level of said fourth color component of said original image, to generate a threshold matrix of said fourth color component, said plurality of fourth dot centers being arranged in said first moire direction and said second moire direction at said moire pitch in said halftone image.

6. The threshold matrix generation method according to claim 2, further comprising the step of setting threshold values in a matrix area of a fourth color component so that a halftone dot grows from each of a plurality of fourth dot centers arranged in a halftone image in accordance with increase of gray level of said fourth color component of said original image, to generate a threshold matrix of said fourth color component, said plurality of fourth dot centers being arranged in both a third tilt direction and a fourth tilt direction orthogonal to said third tilt direction at a pitch in said halftone image, said third tilt direction being tilted relatively to one of two directions in which a plurality of dot centers in one of said first color component and said second color component are arranged at a pitch R, by a tilt angle which is the arctangent of $((K*R)/(J*R))$ (where J, K are positive integers), said pitch of said plurality of fourth dot centers being Ib times or (1/Ib) times the square root of $((J*R)^2+(K*R)^2)$ (where Ib is a positive integer).

7. A halftone image generation method of generating halftone images which represent a multicolor original image, comprising the steps of
   a) generating a halftone image of a first color component in which a halftone dot grows from each of a plurality of first dot centers in accordance with increase of gray level of said first color component of an original image, said plurality of first dot centers being arranged in a first direction and a second direction orthogonal to said first direction in said halftone image, a pitch of said plurality of first dot centers in said first direction being a predetermined value multiple of a pitch of said plurality of first dot centers in said second direction;
   b) generating a halftone image of a second color component in which a halftone dot grows from each of a plurality of second dot centers in accordance with increase of gray level of said second color component of said original image, said plurality of second dot centers being arranged in a third direction and a fourth direction orthogonal to said third direction in said halftone image, an angle formed between said third direction and said first direction being equal to or smaller than that formed between said third direction and said second direction, a pitch of said plurality of second dot centers in said third direction being said predetermined value multiple of a pitch of said plurality of second dot centers in said fourth direction;
   c) acquiring a first tilt direction, a second tilt direction orthogonal to said first tilt direction and a pitch, wherein each of a plurality of moire elements which are repeat elements of first-order moire appearing as periodic repetition of dark and light regions by overlaying a halftone image of said first color component and a halftone image of said second color component which are generated on the assumption that said predetermined value multiple is one time, is positioned at one of a plurality of candidate positions arranged at a moire pitch Pm in both a first moire direction and a second moire direction orthogonal to said first moire direction, said first tilt direction is tilted relatively to said first moire direction by a tilt angle which is the arctangent of $((N*Pm)/(M*Pm))$ (where M, N are positive integers) and said pitch is Ia times or (1/Ia) times the square root of $((M*Pm)^2+(N*Pm)^2)$ (where Ia is a positive integer);
   d) acquiring a changed pitch which is said predetermined value multiple of said pitch acquired in said step c); and
   e) generating a halftone image of a third color component in which a halftone dot grows from each of a plurality of third dot centers in accordance with increase of gray level of said third color component of said original image, said plurality of third dot centers being arranged in said first tilt direction and said second tilt direction, a pitch of said plurality of third dot centers in one direction out of said first tilt direction and said second tilt direction being said changed pitch where an angle formed between said one direction and said first direction is equal to or smaller than that formed between said one direction and said second direction, a pitch of said plurality of third dot centers in the other direction being said pitch acquired in said step c).

8. A halftone image generation method of generating halftone images which represent a multicolor original image, comprising the steps of:
   a) generating a halftone image of a first color component in which a halftone dot grows from each of a plurality of first dot centers in accordance with increase of gray level of said first color component of an original image, said plurality of first dot centers being arranged in a first direction and a second direction orthogonal to said first direction in said halftone image, a pitch of said plurality of first dot centers in said first direction being equal to a pitch of said plurality of first dot centers in said second direction;
   b) generating a halftone image of a second color component in which a halftone dot grows from each of a plurality of second dot centers in accordance with increase of gray level of said second color component of said original image, said plurality of second dot centers being arranged in a third direction and a fourth direction orthogonal to said third direction in said halftone image, an angle formed between said third direction and said first direction being equal to or smaller than that formed between said third direction and said second direction, a pitch of said plurality of second dot centers in said third direction being equal to a pitch of said plurality of second dot centers in said fourth direction;
   c) acquiring a first tilt direction, a second tilt direction orthogonal to said first tilt direction and a pitch, wherein each of a plurality of moire elements which are repeat elements of first-order moire appearing as periodic repetition of dark and light regions by overlaying a halftone image of said first color component and a halftone image of said second color component, is positioned at one of a plurality of candidate positions arranged at a moire pitch Pm in both a first moire direction and a second moire direction orthogonal to said first moire direction, said first tilt direction is tilted relatively to said first moire direction by a tilt angle which is the arctangent of $((N*Pm)/(M*Pm))$ (where M, N are positive integers) and said pitch is Ia times or (1/Ia) times the square root of $((M*Pm)^2+(N*Pm)^2)$ (where Ia is a positive integer); and
   d) generating a halftone image of a third color component in which a halftone dot grows from each of a plurality of third dot centers in accordance with increase of gray level of said third color component of said original image, said plurality of third dot centers being arranged in said first tilt direction and said second tilt direction at said pitch acquired in said step c).

9. The halftone image generation method according to claim 8, wherein
   a pitch Pe of said plurality of first dot centers is equal to that of said plurality of second dot centers and an angle θ is formed between said first direction and said fourth direction, and
   said moire pitch is $(Pe/(2*sin(θ/2)))$ and one direction out of said first moire direction and said second moire direction is a direction which divides an angle formed between said first direction and said fourth direction into two equally.

10. The halftone image generation method according to claim 8, wherein
   one of said first color component, said second color component, and said third color component is black, and
   a pitch of dot centers included in a halftone image of said black is larger than that in a halftone image of each of the other color components.

11. The halftone image generation method according to claim 8, further comprising the step of generating a halftone image of a fourth color component in which a halftone dot grows from each of a plurality of fourth dot centers in accordance with increase of gray level of said fourth color component of said original image, said plurality of fourth dot centers being arranged in said first moire direction and said second moire direction at said moire pitch in said halftone image.

12. The halftone image generation method according to claim 8, further comprising the step of generating a halftone image of a fourth color component in which a halftone dot grows from each of a plurality of fourth dot centers in accordance with increase of gray level of said fourth color component of said original image, said plurality of fourth dot centers being arranged in both a third tilt direction and a fourth tilt direction orthogonal to said third tilt direction at a pitch in said halftone image, said third tilt direction being tilted relatively to one of two directions in which a plurality of dot centers in one of said first color component and said second color component are arranged at a pitch R, by a tilt angle which is the arctangent of $((K*R)/(J*R))$ (where J, K are positive integers), said pitch of said plurality of fourth dot centers being Ib times or (1/Ib) times the square root of $((J*R)^2+(K*R)^2)$ (where Ib is a positive integer).

13. A halftone image generating apparatus for generating halftone images which represent a multicolor original image, comprises:

a memory for storing threshold matrixes; and a halftone image generation part for generating a multicolor halftone image by comparing an original image with said threshold matrixes for each color component, said threshold matrixes being generated by executing steps including the steps of:

a) setting threshold values in a matrix area of a first color component so that a halftone dot grows from each of a plurality of first dot centers arranged in a halftone image in accordance with increase of gray level of said first color component of an original image, to generate a threshold matrix of said first color component, said plurality of first dot centers being arranged in a first direction and a second direction orthogonal to said first direction in said halftone image, a pitch of said plurality of first dot centers in said first direction being a predetermined value multiple of a pitch of said first plurality of first dot centers in said second direction;

b) setting threshold values in a matrix area of a second color component so that a halftone dot grows from each of a plurality of second dot centers arranged in a halftone image in accordance with increase of gray level of said second color component of said original image, to generate a threshold matrix of said second color component, said plurality of second dot centers being arranged in a third direction and a fourth direction orthogonal to said third direction in said halftone image, an angle formed between said third direction and said first direction being equal to or smaller than that formed between said third direction and said second direction, a pitch of said plurality of second dot centers in said third direction being said predetermined value multiple of a pitch of said plurality of second dot centers in said fourth direction;

c) arranging a plurality of third dot centers in a matrix area of a third color component, wherein each of a plurality of moire elements which are repeat elements of first-order moire appearing as periodic repetition of dark and light regions by overlaying a halftone image of said first color component and a halftone image of said second color component which are generated on the assumption that said predetermined value multiple is one time, is positioned at one of a plurality of candidate positions arranged at a moire pitch Pm in both a first moire direction and a second moire direction orthogonal to said first moire direction, and said plurality of third dot centers are arranged in both a first tilt direction tilted relatively to said first moire direction by a tilt angle which is the arctangent of $((N*Pm)/(M*Pm))$ (where M, N are positive integers) and a second tilt direction orthogonal to said first tilt direction, at a pitch which is Ia times or (1/Ia) times the square root of $((M*Pm)^2+(N*Pm)^2)$ (where Ia is a positive integer);

d) changing an arrangement of said plurality of third dot centers where a pitch of one direction out of said first tilt direction and said second tilt direction is said predetermined value multiple of a pitch of the other direction, an angle formed between said one direction and said first direction being equal to or smaller than that formed between said one direction and said second direction; and e) setting threshold values in said matrix area of said third color component so that a halftone dot grows from each of said plurality of third dot centers arranged in a halftone image in accordance with increase of gray level of said third color component of said original image, to generate a threshold matrix of said third color component.

14. A halftone image generating apparatus for generating halftone images which represent a multicolor original image, comprises:

a memory for storing threshold matrixes; and a halftone image generation art for generating a multicolor halftone image by comparing an original image with said threshold matrixes for each color component, said threshold matrixes being generated by executing steps including the steps of:

a) setting threshold values in a matrix area of a first color component so that a halftone dot grows from each of a plurality of first dot centers arranged in a halftone image in accordance with increase of gray level of said first color component of an original image, to generate a threshold matrix of said first color component, said plurality of first dot centers being arranged in a first direction and a second direction orthogonal to said first direction in said halftone image, a pitch of said plurality of first dot centers in said first direction being equal to a pitch of said first plurality of first dot centers in said second direction;

b) setting threshold values in a matrix area of a second color component so that a halftone dot grows from each of a plurality of second dot centers arranged in a halftone image in accordance with increase of gray level of said second color component of said original image, to generate a threshold matrix of said second color component, said plurality of second dot centers being arranged in a third direction and a fourth direction orthogonal to said third direction in said halftone image, an angle formed between said third direction and said first direction being equal to or smaller than that formed between said third direction and said second direction, a pitch of said plurality of second dot centers in said third direction being equal to a pitch of said plurality of second dot centers in said fourth direction;

c) arranging a plurality of third dot centers in a matrix area of a third color component, wherein each of a plurality of moire elements which are repeat elements of first-order moire appearing as periodic repetition of dark and light regions by overlaying a halftone image of said first color component and a halftone image of said second color component, is positioned at one of a plurality of candidate positions arranged at a moire pitch Pm in both a first moire direction and a second moire direction orthogonal to said first moire direction, and said plurality of third dot centers are arranged in both a first tilt direction tilted relatively to said first moire direction by a tilt angle which is the arctangent of $((N*Pm)/(M*Pm))$ (where M, N are positive integers) and a second tilt direction orthogonal to said first tilt direction, at a pitch which is Ia times or (1/Ia) times the square root of $((M*Pm)^2+(N*Pm)^2)$ (where Ia is a positive integer); and d) setting threshold values in said matrix area of said third color component so that a halftone dot grows from each of said plurality of third dot centers arranged in a halftone image in accordance with increase of gray level of said third color component of said original image, to generate a threshold matrix of said third color component.

15. The halftone image generating apparatus according to claim 14, wherein a pitch Pe of said plurality of first dot centers is equal to that of said plurality of second dot centers and an angle θ is formed between said first direction and said fourth direction, and said moire pitch is $(Pe/(2*\sin(\theta/2)))$ and one direction out of said first moire direction and said second moire direction is a direction which divides an angle formed between said first direction and said fourth direction into two equally.

16. The halftone image generating apparatus according to claim 14, wherein one of said first color component, said second color component, and said third color component is black, and a pitch of dot centers included in a halftone image of said black is larger than that in a halftone image of each of the other color components.

17. The halftone image generating apparatus according to claim 14, wherein said steps further include the step of setting threshold values in a matrix area of a fourth color component so that a halftone dot grows from each of a plurality of fourth dot centers arranged in a halftone image in accordance with increase of gray level of said fourth color component of said original image, to generate a threshold matrix of said fourth color component, said plurality of fourth dot centers being arranged in said first moire direction and said second moire direction at said moire pitch in said halftone image.

18. The halftone image generating apparatus according to claim 14, wherein said steps further include the step of setting threshold values in a matrix area of a fourth color component so that a halftone dot grows from each of a plurality of fourth dot centers arranged in a halftone image in accordance with increase of gray level of said fourth color component of said original image, to generate a threshold matrix of said fourth color component, said plurality of fourth dot centers being arranged in both a third tilt direction and a fourth tilt direction orthogonal to said third tilt direction at a pitch in said halftone image, said third tilt direction being tilted relatively to one of two directions in which a plurality of dot centers in one of said first color component and said second color component are arranged at a pitch R, by a tilt angle which is the arctangent of $((K*R)/(J*R))$ (where J, K are positive integers), said pitch of said plurality of fourth dot centers being Ib times or (1/Ib) times the square root of $((J*R)^2+(K*R)^2)$ (where Ib is a positive integer).

* * * * *